(12) United States Patent
Lallement et al.

(10) Patent No.: US 10,832,919 B2
(45) Date of Patent: Nov. 10, 2020

(54) MEASURING AND MODELING MATERIAL PLANARIZATION PERFORMANCE

(71) Applicant: International Business Machines Corporation, Armonk, NY (US)

(72) Inventors: Romain Lallement, Troy, NY (US); Stuart A. Sieg, Albany, NY (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 15/950,628

(22) Filed: Apr. 11, 2018

(65) Prior Publication Data
US 2019/0318935 A1   Oct. 17, 2019

(51) Int. Cl.
| | |
|---|---|
| *G06G 7/48* | (2006.01) |
| *H01L 21/3105* | (2006.01) |
| *H01L 21/027* | (2006.01) |
| *H01L 21/311* | (2006.01) |
| *H01L 21/66* | (2006.01) |
| *G06F 30/20* | (2020.01) |
| *G06F 111/20* | (2020.01) |

(52) U.S. Cl.
CPC ........ *H01L 21/31056* (2013.01); *G06F 30/20* (2020.01); *H01L 21/0274* (2013.01); *H01L 21/31111* (2013.01); *H01L 21/31144* (2013.01); *H01L 22/12* (2013.01); *G06F 2111/20* (2020.01)

(58) Field of Classification Search
CPC ................. G06F 30/20; H01L 21/0274; H01L 21/31111; H01L 21/31144; H01L 21/31056; H01L 22/12

USPC ........................................................... 703/6
See application file for complete search history.

(56) References Cited

U.S. PATENT DOCUMENTS

| | | | |
|---|---|---|---|
| 5,655,110 A | * | 8/1997 | Krivokapic ......... G03F 7/70625 700/95 |
| 6,509,952 B1 | | 1/2003 | Govil et al. |
| 7,155,689 B2 | | 12/2006 | Pierrat et al. |

(Continued)

OTHER PUBLICATIONS

Lionel Ravel et al., "Anticipation of dimensional issues caused by topography during photo lithography," Proc. of SPIE, 2011, 10 pages, vol. 8166, 81663J-1.

(Continued)

*Primary Examiner* — Andre Pierre Louis
(74) *Attorney, Agent, or Firm* — Daniel Morris; Ryan, Mason & Lewis, LLP

(57) ABSTRACT

A method for modeling planarization performance of a given material includes patterning a first photoresist layer over a first material deposited over a substrate. The method also includes etching portions of the first material exposed by the patterned first photoresist layer to create a patterned topography of the first material comprising two or more different design macros in two or more different regions. The method further includes coating the given material over the patterned topography of the first material, patterning a second photoresist layer over the given material, measuring the critical dimension of a metrology feature in each of the two or more different regions, and utilizing the measured critical dimensions of the metrology feature in the two or more different regions to generate a model of the planarization performance of the given material by relating the measured critical dimensions to focal planes of the given material.

18 Claims, 26 Drawing Sheets

(56) References Cited

U.S. PATENT DOCUMENTS

| | | |
|---|---|---|
| 7,695,877 B2 | 4/2010 | Leunissen et al. |
| 7,927,764 B2 * | 4/2011 | Setta ................. H01L 21/31144 |
| | | 430/394 |
| 8,024,675 B1 | 9/2011 | Gupta et al. |
| 8,572,518 B2 | 10/2013 | Tyminski et al. |
| 9,026,954 B2 | 5/2015 | Perez et al. |
| 9,046,788 B2 | 6/2015 | Gabor et al. |
| 9,678,421 B2 | 6/2017 | Levinski et al. |
| 2016/0240444 A1 * | 8/2016 | Chao ................. H01L 29/66795 |

OTHER PUBLICATIONS

Pei-Yang Yan, "Understanding Bossung curve asymmetry and focus shift effect in EUV lithography," Proc. of SPIE, 2002, pp. 279-287, vol. 4562.

* cited by examiner

100

150

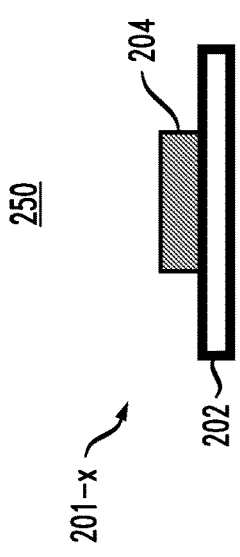
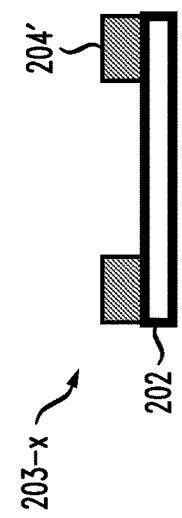
FIG. 2B
250
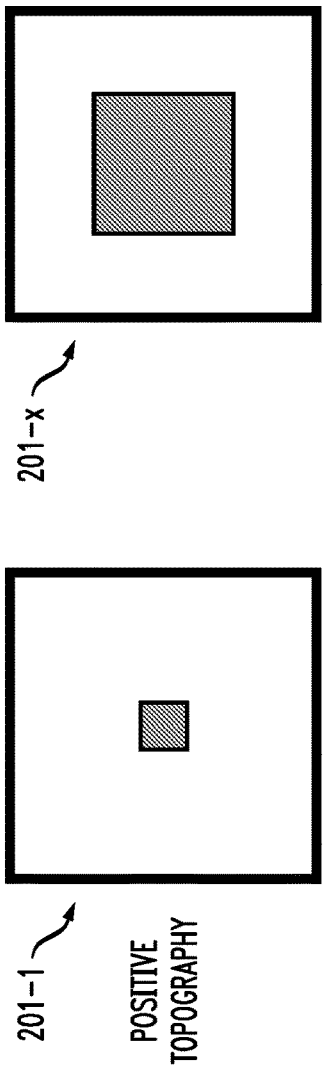
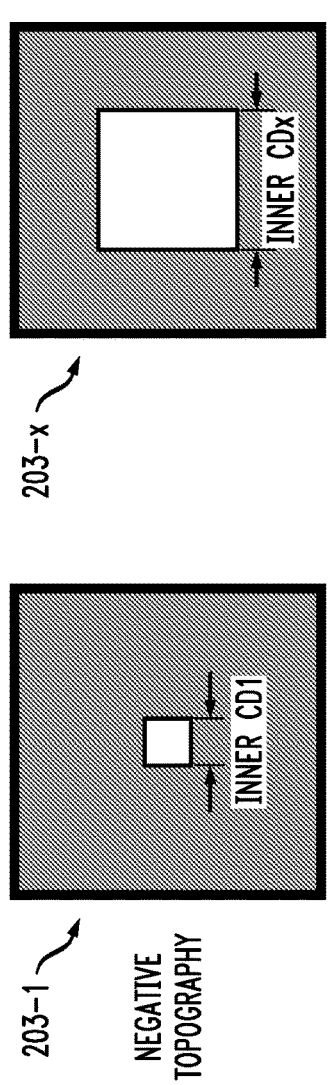
FIG. 2A
200

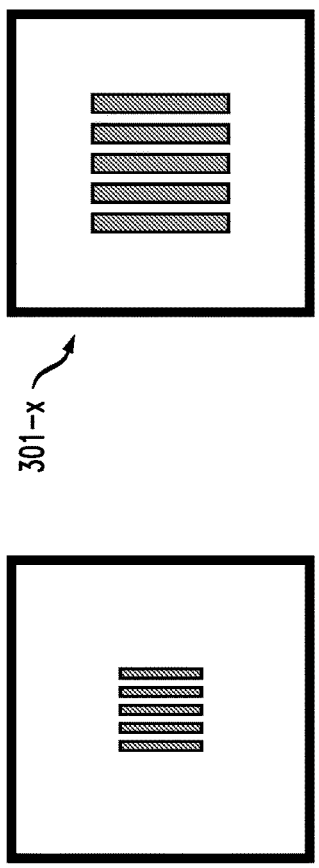
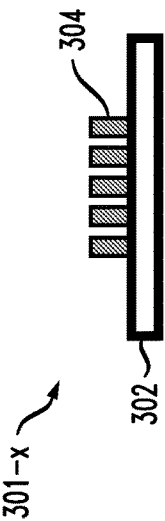
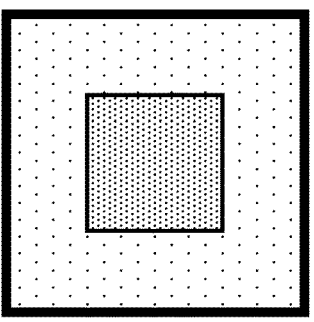
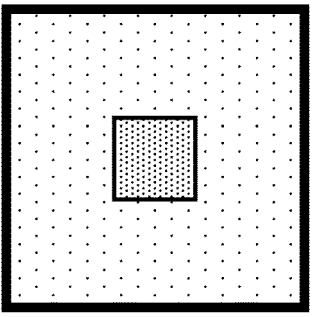
FIG. 3A
300
FIG. 3B
350

FIG. 4
400
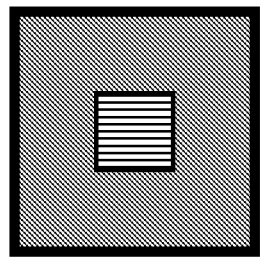
404
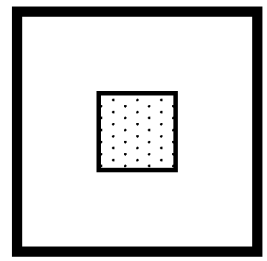
408
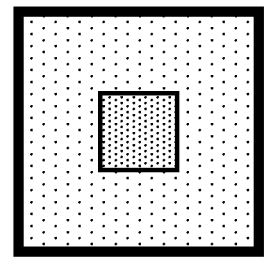
412
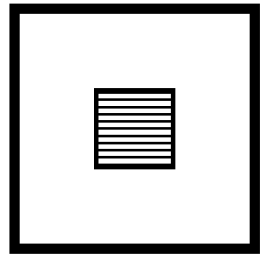
403
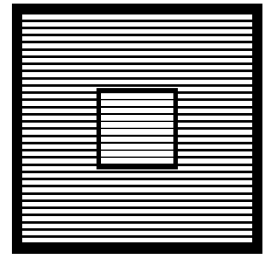
407
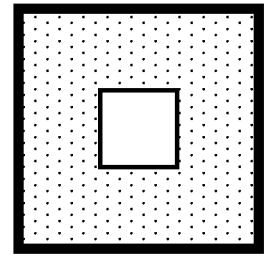
411
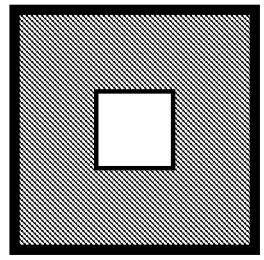
402
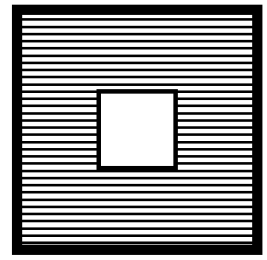
406
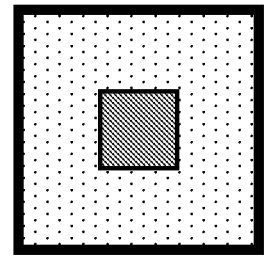
410
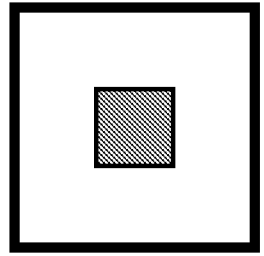
401
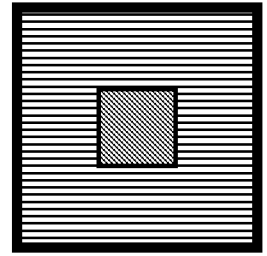
405
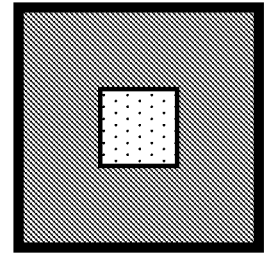
409

700

1000

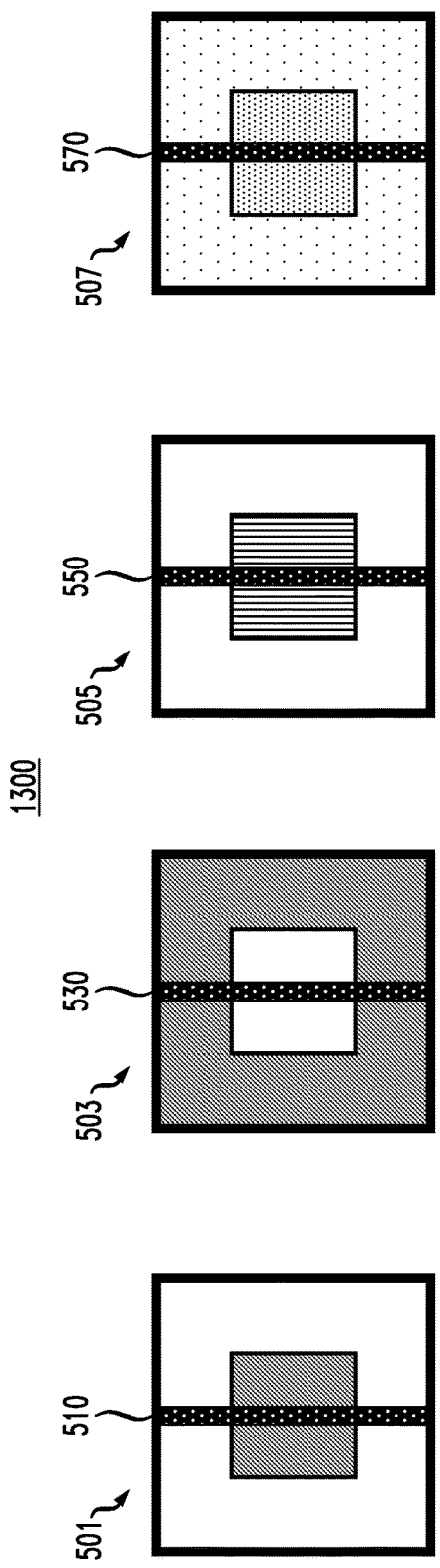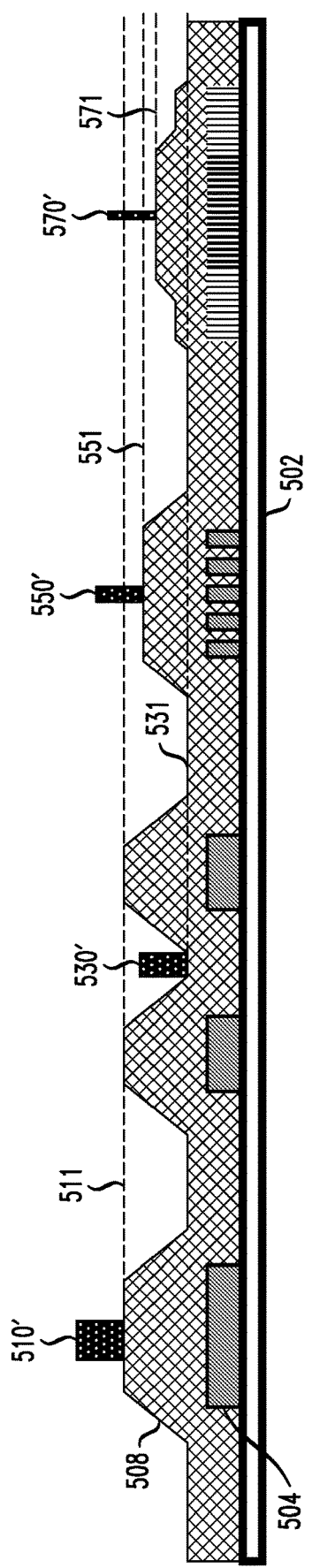
FIG. 13
1300

1400

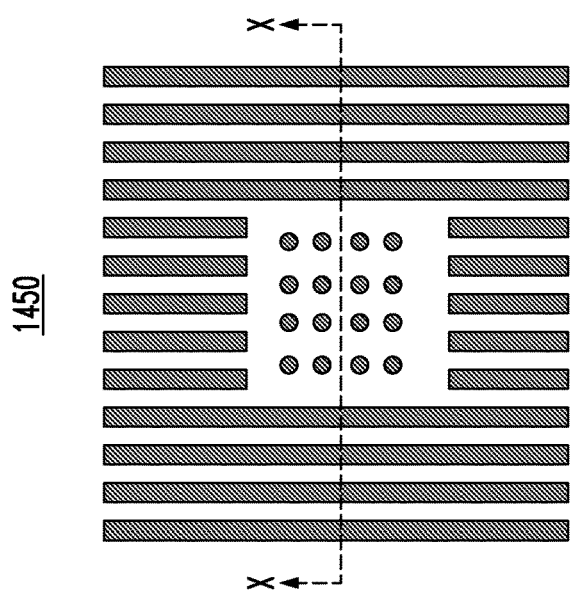
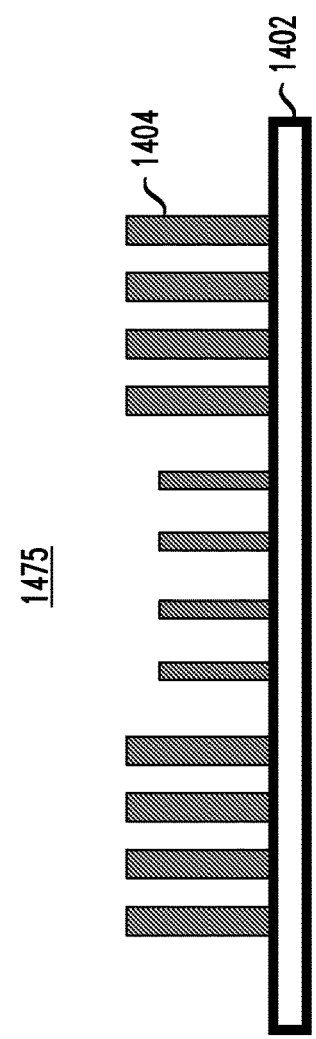
FIG. 14B

FIG. 14C
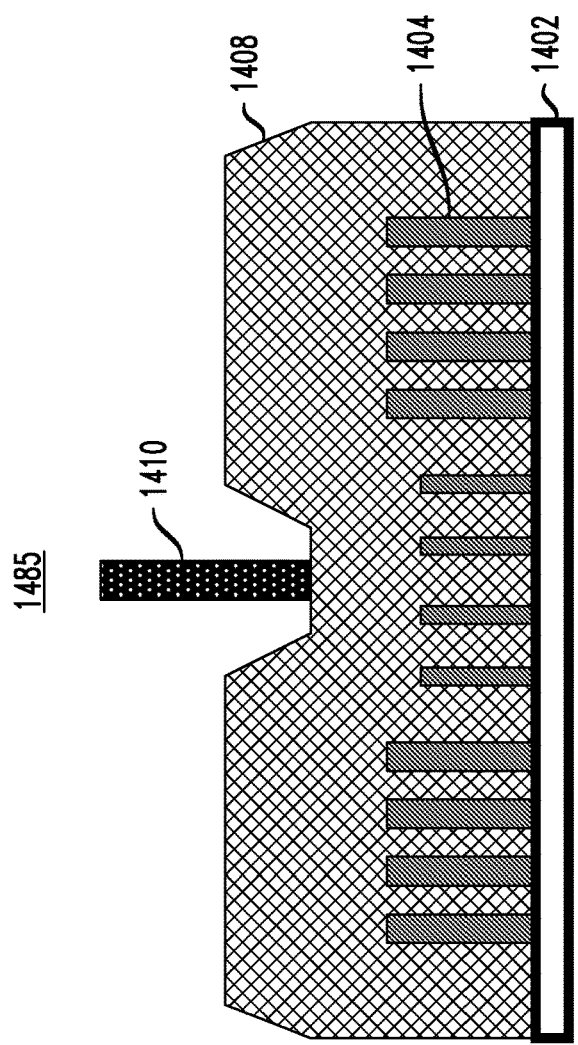
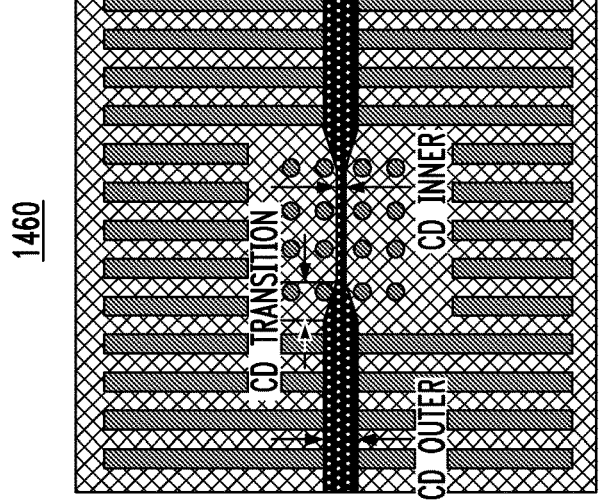

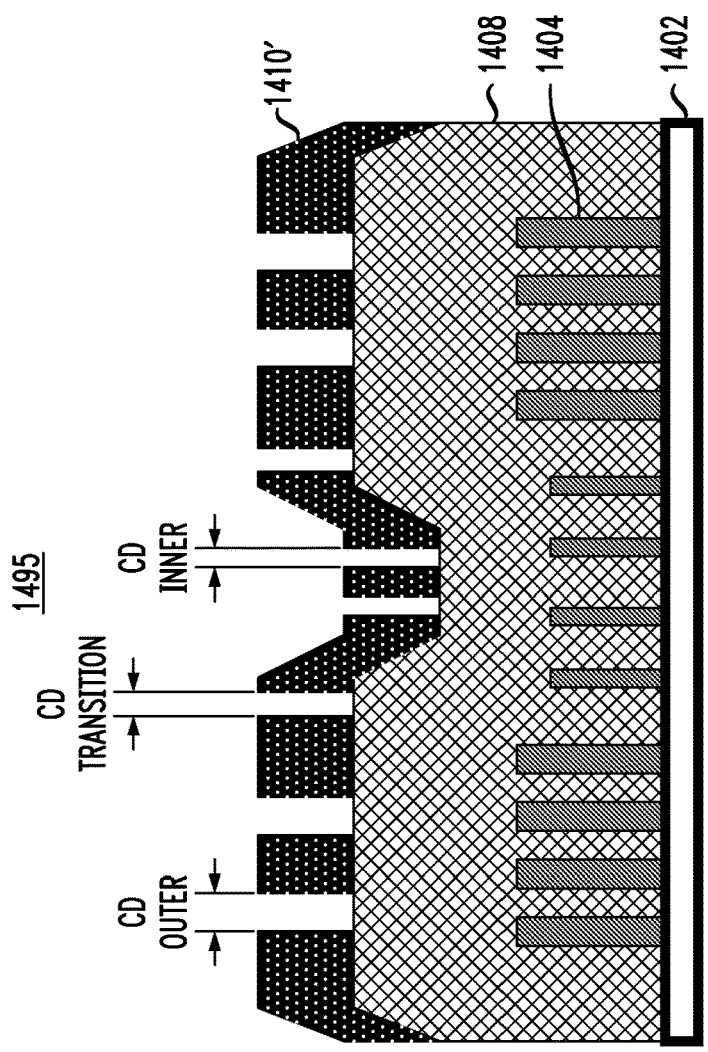
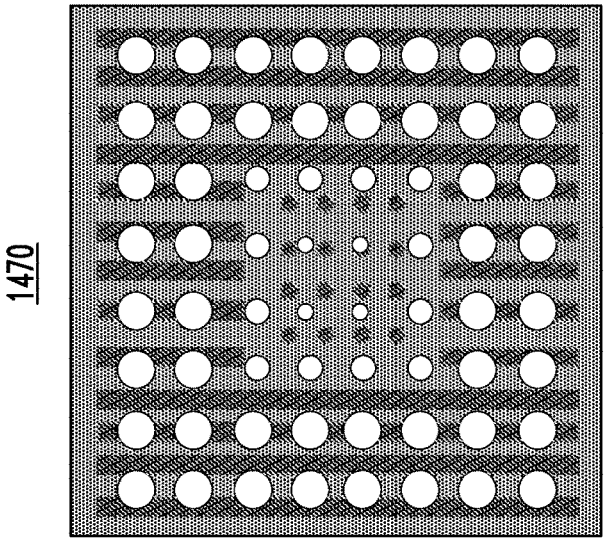
FIG. 14D

1500

1700

1800

2200

MEASURING AND MODELING MATERIAL PLANARIZATION PERFORMANCE

BACKGROUND

The present application relates to semiconductors, and more specifically, to techniques for forming semiconductor structures. Optical lithography processes are widely used for patterning features in semiconductor structures. As semiconductor structures continue to scale to smaller and smaller dimensions, improvements for optical lithography processing are needed to render smaller and smaller image sizes for semiconductor structures.

SUMMARY

Embodiments of the invention provide techniques for measuring and modeling planarization performance of a material.

In one embodiment, a method for modeling planarization performance of a given material comprises patterning, using a first mask, a first photoresist layer over a first material deposited over a top surface of a substrate, the first mask defining two or more different design macros to be patterned in two or more different regions of the first photoresist layer. The method also comprises etching portions of the first material exposed by the patterned first photoresist layer to create a patterned topography of the first material comprising the two or more different design macros in the two or more different regions, coating the given material over the patterned topography of the first material, and patterning, using a second mask, a second photoresist layer over the given material, the second mask defining a metrology feature for measuring a critical dimension in each of the two or more different regions. The method further comprises measuring the critical dimension of the metrology feature in each of the two or more different regions and utilizing the measured critical dimensions of the metrology feature in the two or more different regions to generate a model of the planarization performance of the given material by relating the measured critical dimensions to focal planes of the given material.

In another embodiment, a method for modeling planarization performance of a given material comprises patterning, using a first mask, a first photoresist layer over a first material deposited over a top surface of a substrate, the first mask defining a given design macro to be patterned in each of two or more different regions of the first photoresist layer. The method also comprises etching portions of the first material exposed by the patterned first photoresist layer to create a patterned topography of the first material comprising the given design macro in each of the two or more different regions, coating the given material over the patterned topography of the first material, and patterning, using a second mask, a second photoresist layer over the given material using different focus settings for a lithographic processing tool, the second mask defining a metrology feature for measuring a critical dimension of the given design macro in each of the two or more different regions. The method further comprises measuring the critical dimension of the metrology feature in each of the two or more different regions and generating an anchor curve relating the measured critical dimensions of the metrology feature with the different focus settings for the two or more different regions, wherein the anchor curve is used to model planarization performance of the given material.

In another embodiment, a method for modeling planarization performance of a given material comprises generating an anchor curve relating focus to critical dimension of a metrology feature formed over the given material in each of two or more different regions of a substrate, each of the two or more different regions of the substrate having a same design macro topography of a first material formed thereon. The method also comprises utilizing one or more additional design macros to pattern the first material on one or more additional regions of the substrate, the given material being coated over the one or more additional regions. The method further comprises measuring the critical dimension of the metrology feature formed over the given material in the one or more additional regions, and building a model of the planarization performance of the given material by relating measured critical dimension of the metrology feature in the one or more additional regions with the anchor curve.

BRIEF DESCRIPTION OF THE DRAWINGS

FIG. 2A depicts a top-down view of solid design macros, according to an embodiment of the present invention.

FIG. 2B depicts a cross-sectional view of the solid design macros of FIG. 2A, according to an embodiment of the present invention.

FIG. 3A depicts a top-down view of patterned feature design macros, according to an embodiment of the present invention.

FIG. 3B depicts a cross-sectional view of the patterned feature design macros of FIG. 3A, according to an embodiment of the present invention.

FIG. 4 depicts a top-down view of different design macros, according to an embodiment of the present invention.

FIG. 13 depicts a cross-sectional view of the FIG. 12 structure following printing of metrology features over the planarization material, according to an embodiment of the present invention.

FIG. 14B depicts top-down and cross-sectional views of a design macro topography created on a substrate, according to an embodiment of the present invention.

FIG. 14C depicts top-down and cross-sectional views of the FIG. 14B structure following formation of the planarizing material and measurement of critical dimension, according to an embodiment of the present invention.

FIG. 14D depicts top-down and cross-sectional view of the FIG. 14B structure following formation of the planarizing material and an alternate measurement of critical dimension, according to an embodiment of the present invention.

DETAILED DESCRIPTION

Figure 1A:
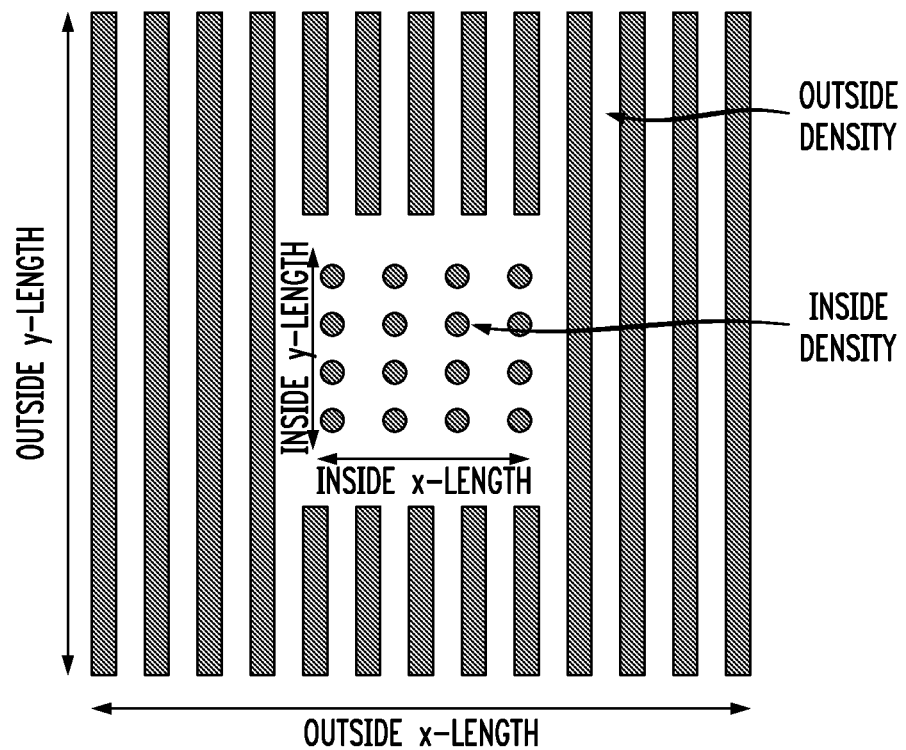
FIG. 1A depicts a top-down view of a design topography, according to an embodiment of the present invention.

Illustrative embodiments of the invention may be described herein in the context of illustrative methods for measuring and modeling patterning material planarization performance. However, it is to be understood that embodiments of the invention are not limited to the illustrative methods, apparatus, systems and devices but instead are more broadly applicable to other suitable methods, apparatus, systems and devices.

In semiconductor lithography processing, a goal is to accurately pattern resist material on a surface (e.g., of a substrate or other material). The surface on which the resist material is to be patterned, however, may not be fully flat. In optics, a key metric for characterizing the ability of the lithographic system is Depth of Focus (DoF). Many factors affect the ability of a lithographic imaging system to provide a properly focused image. The concept of DoF refers to a region of an aerial image in which the focus or intensity is maximized (e.g., the focal plane). Light intensity distribution of the image may be a Gaussian distribution, wherein the intensity falls off sharply on each side of the focal plane. DoF may be viewed as a range of focus errors that a lithographic process can tolerate while giving acceptable results. Changes in focus affect results in that the profile of the resist material or the Critical Dimension (CD) printed into the resist material may change, and the sensitivity to processing errors changes.

As a general matter, it is desired to have a large DoF value for lithographic processing. Advanced semiconductor fabrication technology, particularly with scaling to smaller and smaller dimensions, results in extremely small DoF. One way to address this is to coat an organic planarizing layer (OPL), which may be used to flatten a surface. Today, however, even planarization properties are challenged and thus are not sufficient. To accurately characterize planarization, one technique is to cleave the topography structure and manually measure it. Such techniques, however, are time consuming and human centric and are thus limited.

Some embodiments provide techniques for measuring planarization of a surface using patterning miss performance on top of an uneven surface as a metric for determining planarization. As a comparison to common photography, this may be viewed as measuring the "blur" to know how far a subject is. Embodiments provide techniques for measuring planarization performance of a surface that are in line, automatic, fast and non-destructive. As techniques described herein are automatic, they are faster and do not require human resources. The speed of techniques described herein permit collection of an extended data set. Techniques described herein can utilize in line scanning electron microscope (SEM) metrology, which is more systematic and reliable. Further, techniques described herein are non-destructive, and thus involve more turnaround at lower expense.

As a result of extensive data collection, embodiments can build an accurate planarization model. Some embodiments may utilize extreme ultraviolet (EUV) tools (e.g., with a wavelength of approximately 13.5 nanometers (nm)) to ensure that there is no reflection or interference, as EUV light is not reflected in this case. This is advantageous from a modeling standpoint, as it removes a component (e.g., reflected light) which would otherwise need to be accounted for. In some embodiments, a regular expression tool (e.g, a deep ultraviolet tool which uses a wavelength of 193 or 248 nm) may be used, although at this range of wavelengths light will reflect from the substrate and needs to be accounted for during modeling. Resist thinning may add up a contribution in such cases and affect the measurement.

In some embodiments, a method for measuring or determining planarization includes: (i) creating a topography on a wafer or substrate, where the created topography may include various designs (e.g., tens, hundreds or thousands of different design macros); (ii) coating a material of interest whose planarization behavior is to be determined; (iii) exposing a feature in the topography and material of interest; (iv) measuring a critical dimension (CD); and (v) modeling planarization against the design.

Figure 1B:
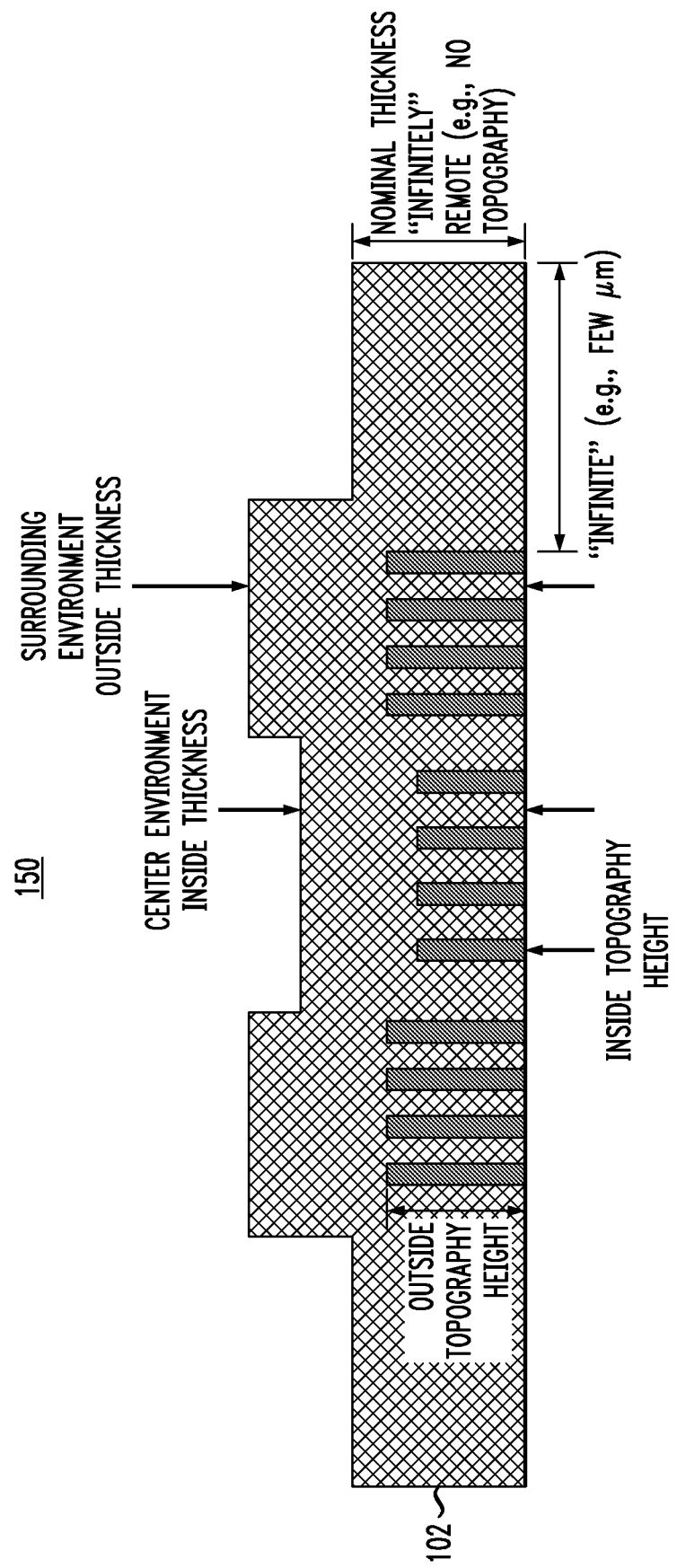
FIG. 1B depicts a cross-sectional view of the FIG. 1A design topography with a planarizing material formed thereof, according to an embodiment of the invention.

FIG. 1A depicts a top-down view 100 of an example design topography. As shown, there is an "outside" design and an "inside" design. FIG. 1B depicts a side cross-sectional view 150 of the design topography with a spin-coated organic layer or other resist material 102 patterned on top of the design topography. The outside design includes lines and spaces, which may be at various widths, pitches, height, profile, etc. The inside design includes a pattern of holes and pillars, which may be at various widths, pitches, height, profile, etc. The nominal thickness of the resist material 102 is the thickness of the resist material that is flat or "infinite" in the scale of the wafer away from the design topography. In some embodiments, this may refer to a distance of a few micrometers (μm) from an edge of the outside design.

Although FIGS. 1A and 1B show an example where the outside design is lines and spaces while the inside design is holes and pillars, embodiments are not so limited. In other embodiments, the outside design may be holes and pillars while the inside design is lines and spaces, the outside design and the inside design may be both be, holes and pillars or lines and spaces, etc. The design topography may be adjusted as desired, such as using various controlled macro parameters including but not limited to: the inner macro or design size; the outer macro or design size; the outside design density (e.g., from 0% to 100%); the inside design density (e.g., from 0% to 100%); the outside design feature type (e.g., lines and spaces, holes and pillars, etc.); the inside design feature type (e.g., lines and spaces, holes and pillars, etc.); the outside design aspect ratio (e.g., the outside y-length and outside x-length); the inside design aspect ratio (e.g., the inside y-length and the inside x-length); topography height; OPL or other material thickness (e.g., thickness of material 102); topography profile; etc. Changing these parameters will affect how the spin-coated material (e.g., 102) will behave and planarize.

Various types of macro designs will now be described in detail below with respect to FIGS. 2-4. It is to be appreciated, however, that the example macro designs shown in FIGS. 2-4 are presented by way of example only, and that embodiments are not limited to these specific macro designs.

FIG. 2A depicts a top-down view 200 of "solid" design macros, where a topography material 204/204' is created on a substrate or wafer 202 as illustrated in the cross-sectional view 250 of the solid design macros shown in FIG. 2B. The topography may be etched in the substrate 202 (e.g., where the topography material 204/204' is the same as the material of the substrate 202), or may be a material that is deposited on the substrate 202 and then etched (e.g., where the topography material 204/204' may be the same as or different than the material of the substrate 202). The topography material 204/204' may be silicon (Si), silicon oxide (SiO) or any other suitable material. The substrate 202 may be Si or another suitable material such as SiO, silicon nitride (SiN), etc. The top-down view 200 of FIG. 2A more particularly shows "positive" topography design macros 201-1 and 201-x, and "negative" topography design macros 203-1 and 203-x, which show the etched area in white. Design macros 201-1 and 203-1 include an inner critical dimension CD1, with design macros 201-x and 203-x showing an inner critical dimension CDx. The CD may range from smaller (design macros 201-1 and 203-1) to larger (201-x and 203-x).

FIG. 3A depicts a top-down view 300 of patterned feature design macros, where topography material 304/304' is created on a substrate or wafer 302 as illustrated in the cross-sectional view 350 shown in FIG. 3B. The topography material 304/304' may be similar to that of topography material 204/204', and the substrate material 302 may be similar to that of substrate 202. The top-down view 300 of FIG. 3A more particularly shows first design macros 301-1 and 301-x and second design macros 303-1 and 303-x. The size of the inner versus outer design may vary as desired, where the design macros 301-1 and 303-1 show smaller inner design and design macros 301-x and 303-x show larger inner design. The design macros 301-1 and 301-x include patterns of lines and spaces in the inner design, with a blank outer design. The design macros 303-1 and 303-x include patterns of holes and pillars in both the inner and outer design. It is to be appreciated that the density of features (e.g., lines and spaces, holes and pillars, etc.) in the inner and/or outer design may vary as desired.

FIG. 4 depicts a number of different design macros, mixing and matching different types of inside and outside designs. Design macro 401 is similar to design macros 101-1 and 101-x (e.g., a blank or empty outside design with a solid inside design), design macro 402 is similar to design macros 103-1 and 103-x (e.g., a solid outside design and a blank or empty inside design). Design macro 403 includes a blank or empty outside design and a lines and spaces inside design. Design macro 404 includes a solid outside design and a lines and spaces inside design. Design macro 405 includes a lines and spaces outside design and a solid inside design. Design macro 406 includes a lines and spaces outside design and a blank or empty inside design. Design macro 407 includes a lines and spaces outside design with a first density and a lines and spaces inside design with a second density. Design macro 408 includes a blank or empty outside design and a holes and pillars inside design. Design macro 409 includes a solid outside design and a holes and pillars inside design. Design macro 410 includes a holes and pillars outside design and a solid inside design. Design macro 411 includes a holes and pillars outside design and a blank or empty inside design. Design macro 412 includes a holes and pillars outside design with a first density and a holes and pillars inside design with a second density. It is to be appreciated that the various combination of inside and outside design macros shown in FIG. 4 are presented by way of example only, and that other types and combinations of inside and outside design macros may be used in other embodiments.

Figure 5:
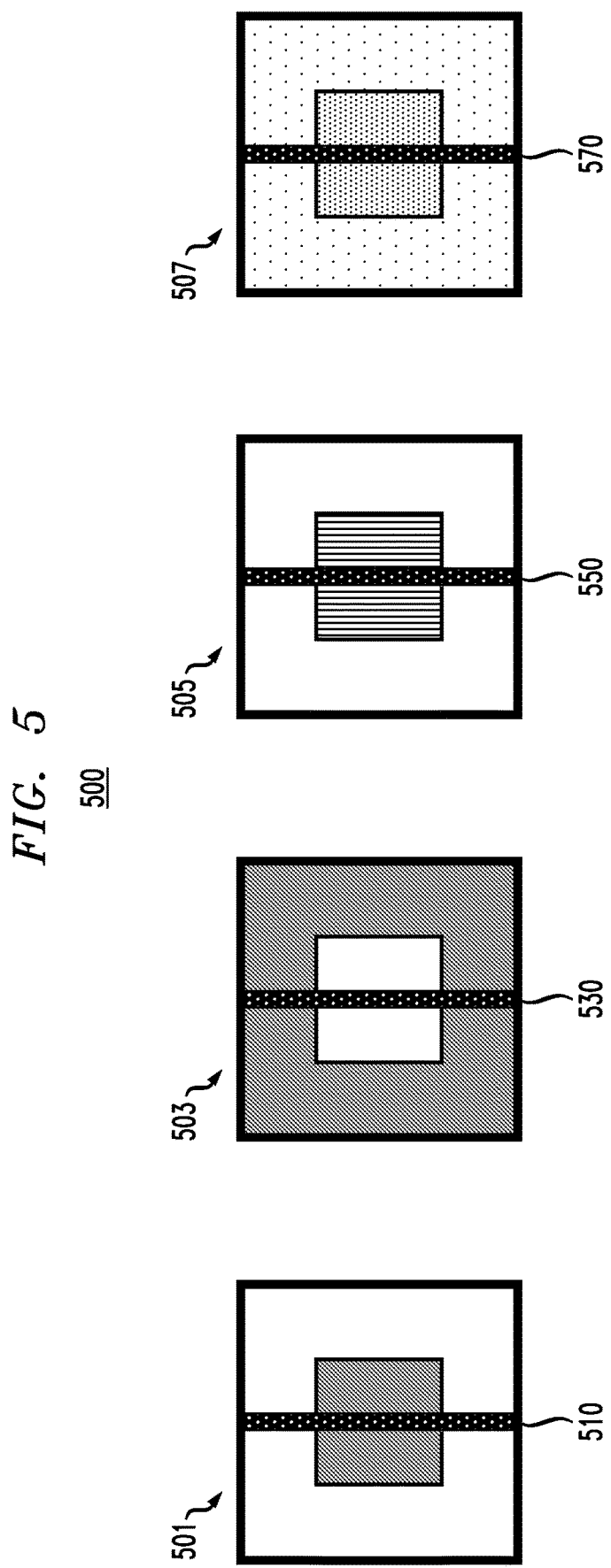
FIG. 5 depicts a top-down view of a selection of design macros, according to an embodiment of the present invention.

In some embodiments, many different design macros (e.g., tens, hundred or thousands of different design macros) are printed at the same time on the same wafer to study planarization or coating properties of a selected material. An example of such a process will be described below with respect to FIGS. 5-11. FIG. 5 shows a selection of four design macros that will be printed at the same time on the same wafer in this example process. It is to be appreciated, however, that embodiments may utilize more than four design macros in some embodiments. The selected design macros of FIG. 5 include design macros 501, 503, 505 and 507. Design macro 501 is a blank or empty outside design with a solid inside design, design macro 503 is a solid outside design with a blank or empty inside design, design macro 505 is a blank or empty outside design and a lines and spaces inside design, and design macro 507 is a holes and pillars outside design with a first (lower) density and a holes and pillars inside design with a second (higher) density. FIG. 5 also shows a "metrology feature" 510, 530, 550, 570 (for design macros 501, 503, 505, 507, respectively) that is formed over each of the topologies of interest. The metrology features 510, 530, 550, 570 may be formed by means of photo resist exposure.

Figure 6:
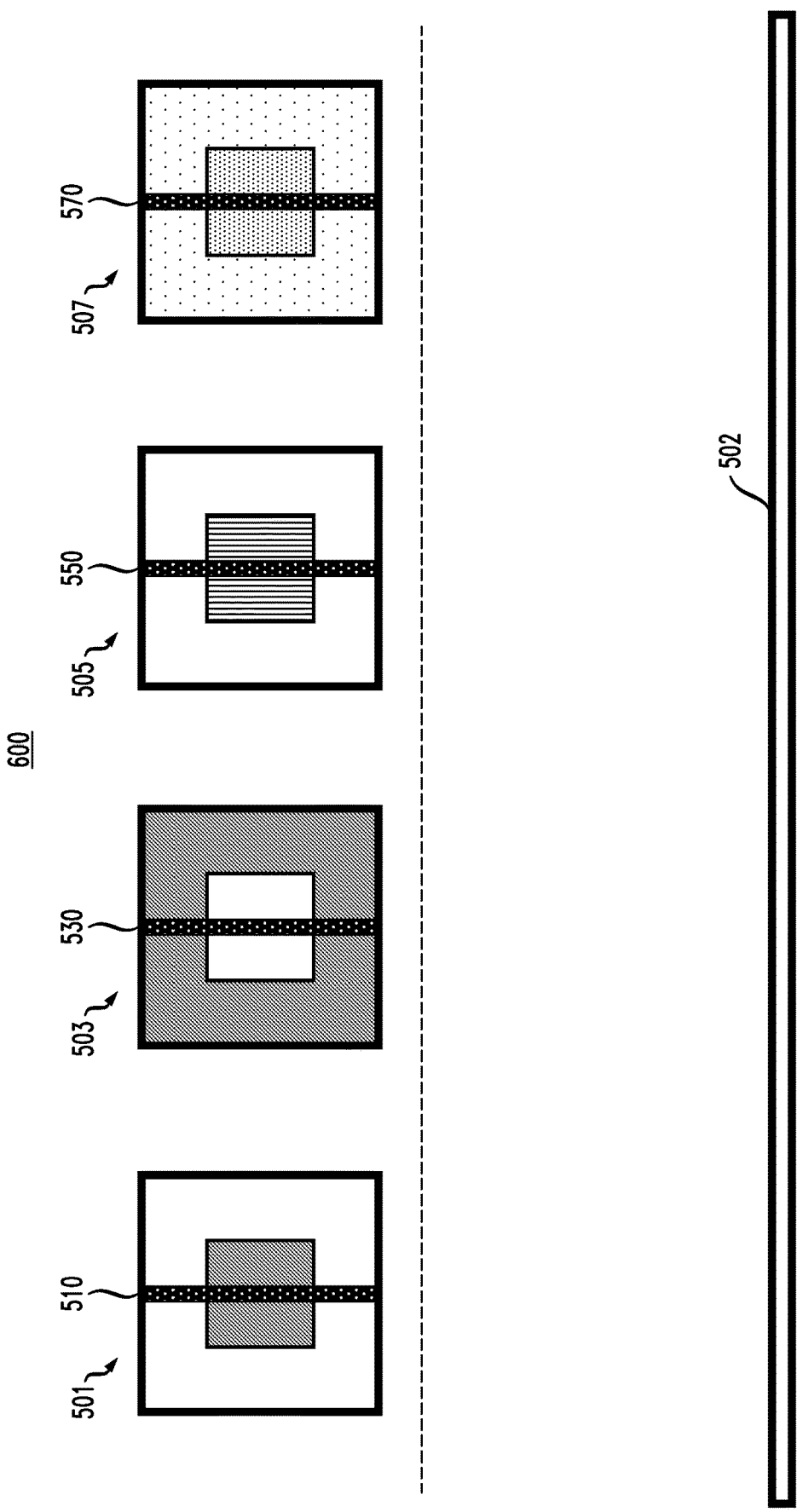
FIG. 6 depicts a cross-sectional view of a substrate on which the FIG. 5 design macros are utilized to create a topography, according to an embodiment of the present invention.

FIG. 6 shows a cross-sectional view 600 of a substrate 502, on which the design macros 501, 503, 505, 507 will be printed as described below. For clarity of illustration, the design macros 501, 503, 505, 507 are shown above the dashed line in FIGS. 6-12.

Figure 7:
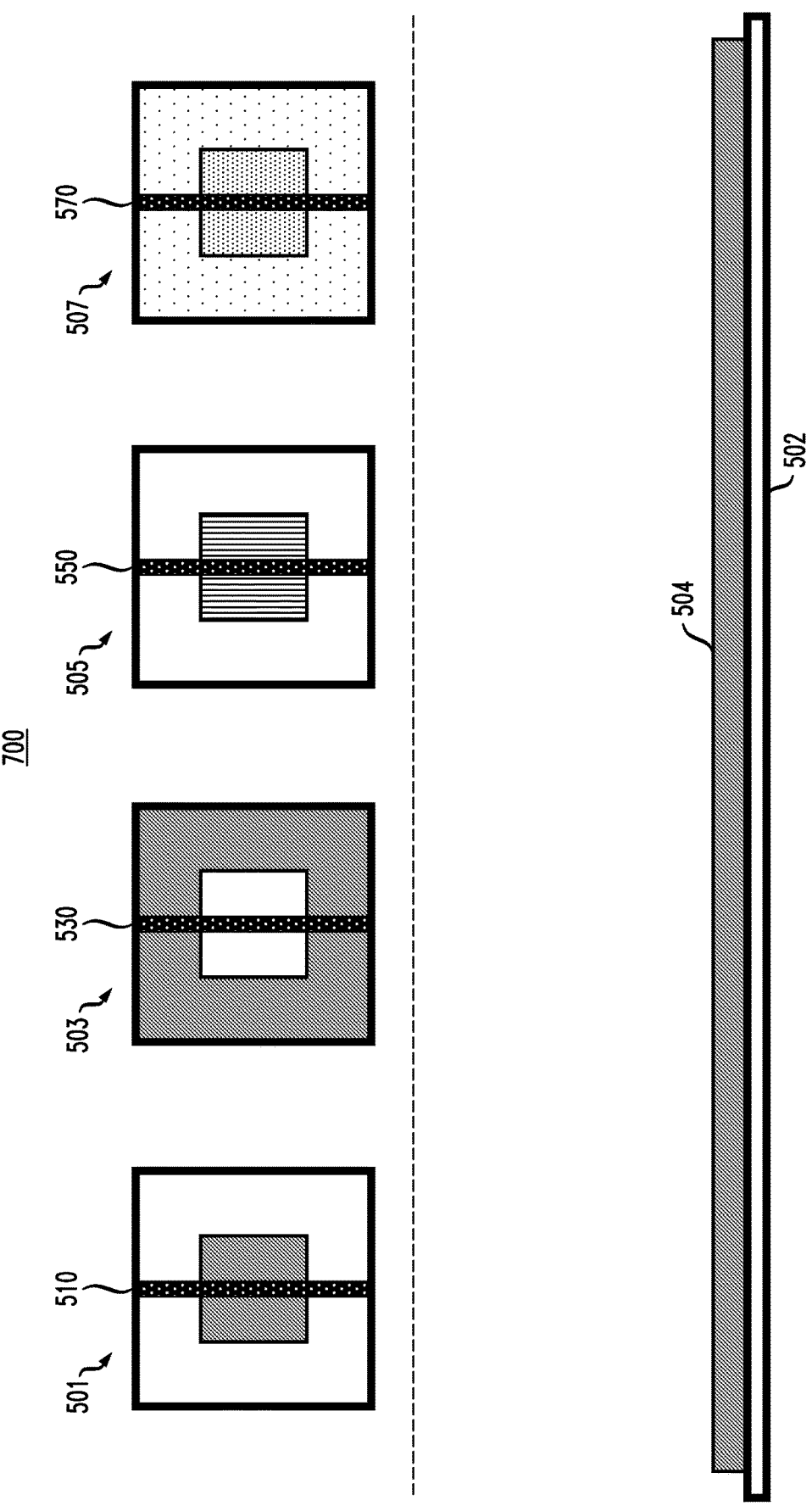
FIG. 7 depicts a cross-sectional view of the FIG. 6 structure following deposition of a material over the substrate, according to an embodiment of the present invention.

FIG. 7 shows a cross-sectional view 700 of the substrate 502 following blanket deposition of a material 504, also referred to herein as blanket deposited material 504. The blanket deposited material 504 may be Si, SiO or another suitable material. The thickness of the blanket deposited material 504 defines the height of the topography.

Figure 8:
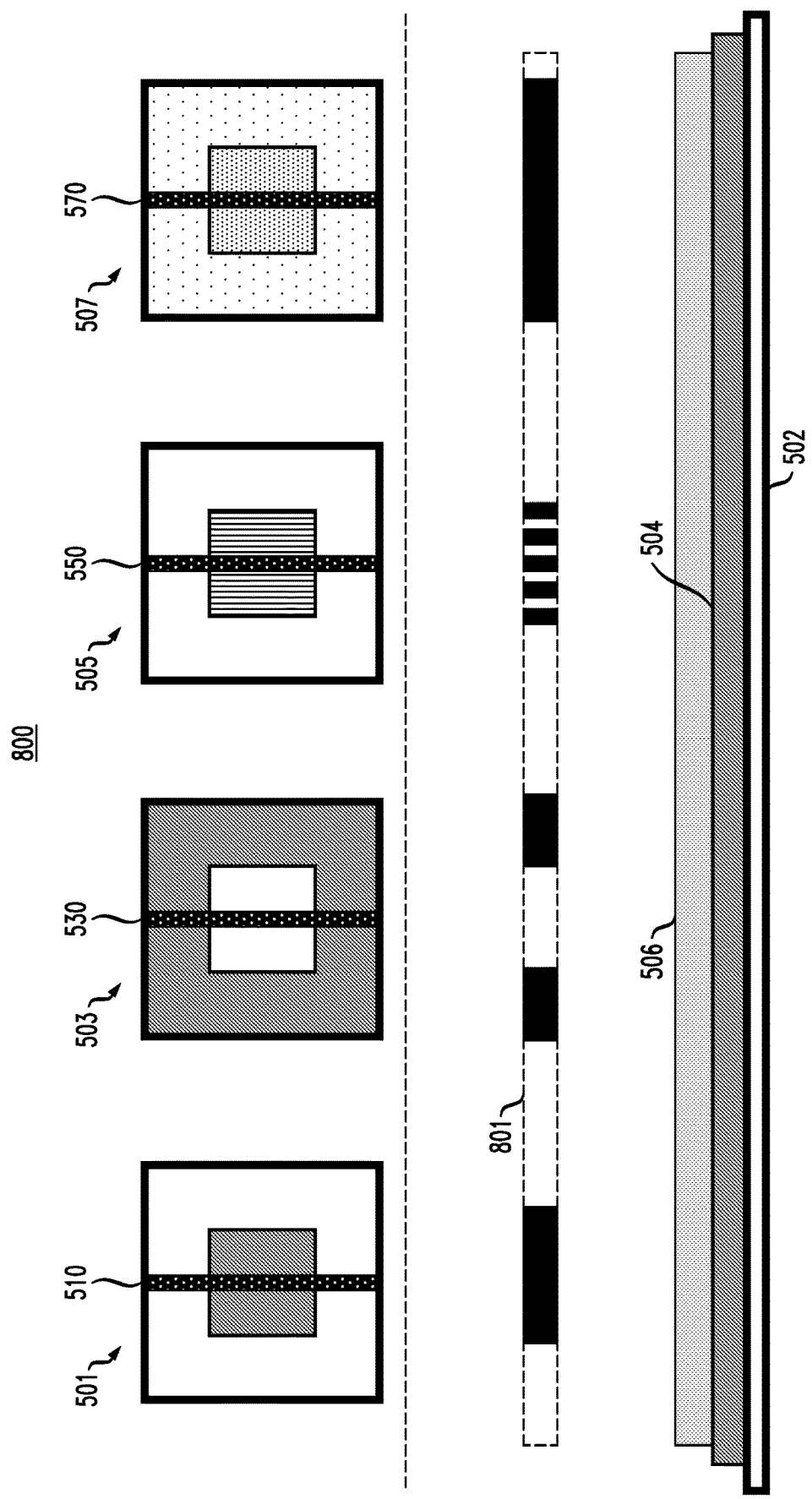
FIG. 8 depicts a cross-sectional view of the FIG. 7 structure following coating of a resist material, according to an embodiment of the present invention.

FIG. 8 shows a cross-sectional view 800 of the structure, illustrating a first mask or reticle 801 that is used to help print the topography in photoresist material 506 that is coated over the blanket deposited material 504.

Figure 9:
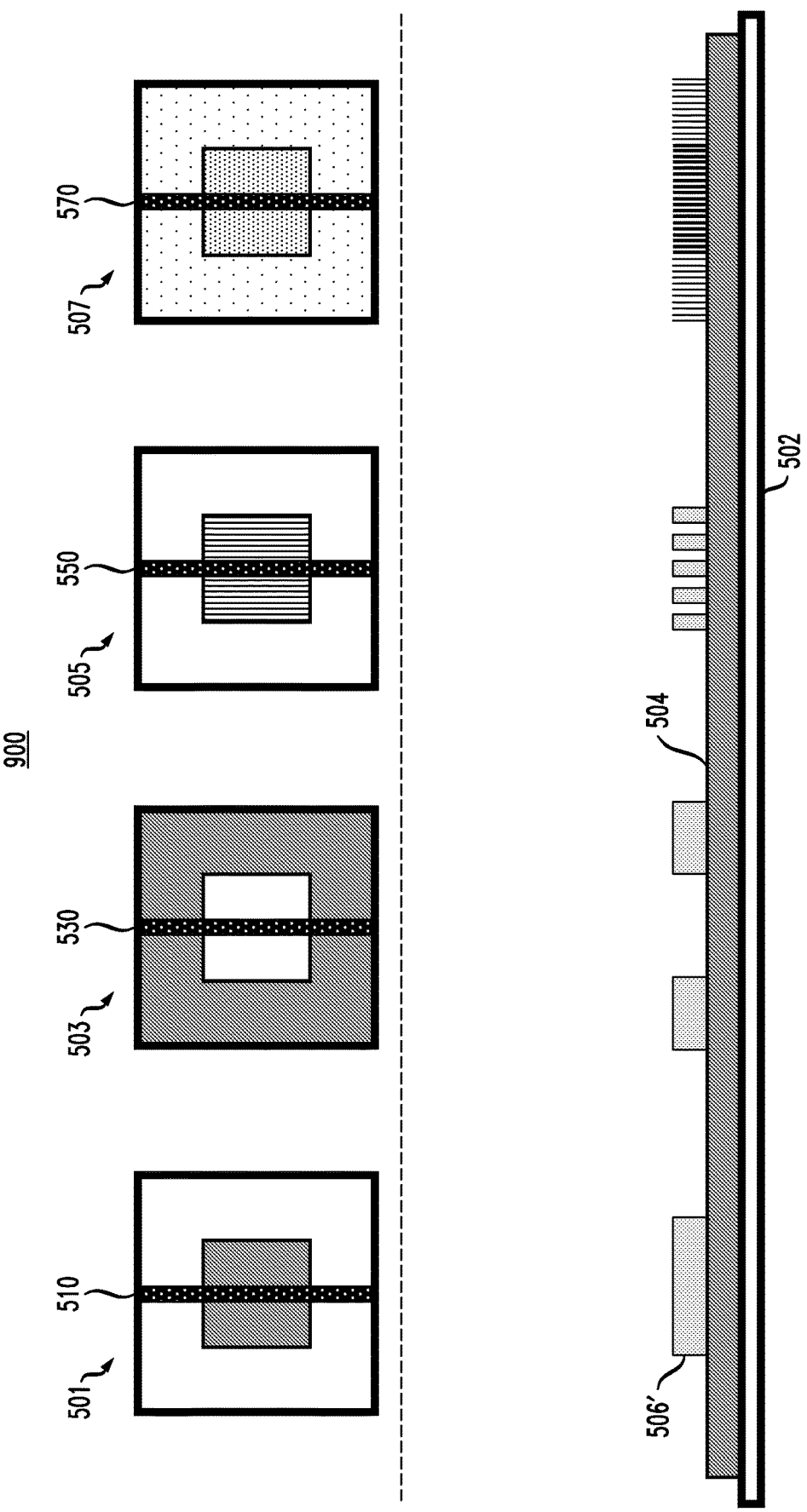
FIG. 9 depicts a cross-sectional view of the FIG. 8 structure following patterning of the resist material matching the FIG. 5 design macros, according to an embodiment of the present invention.

FIG. 9 shows a cross-sectional view 900 of the structure following patterning the topography "density" of the design macros 501, 503, 505, 507 over the blanket deposited material 504. This is done by exposing the photoresist material 506 utilizing the first mask 801 shown in FIG. 8, resulting in the patterned resist material 506' shown in FIG. 9.

Figure 10:
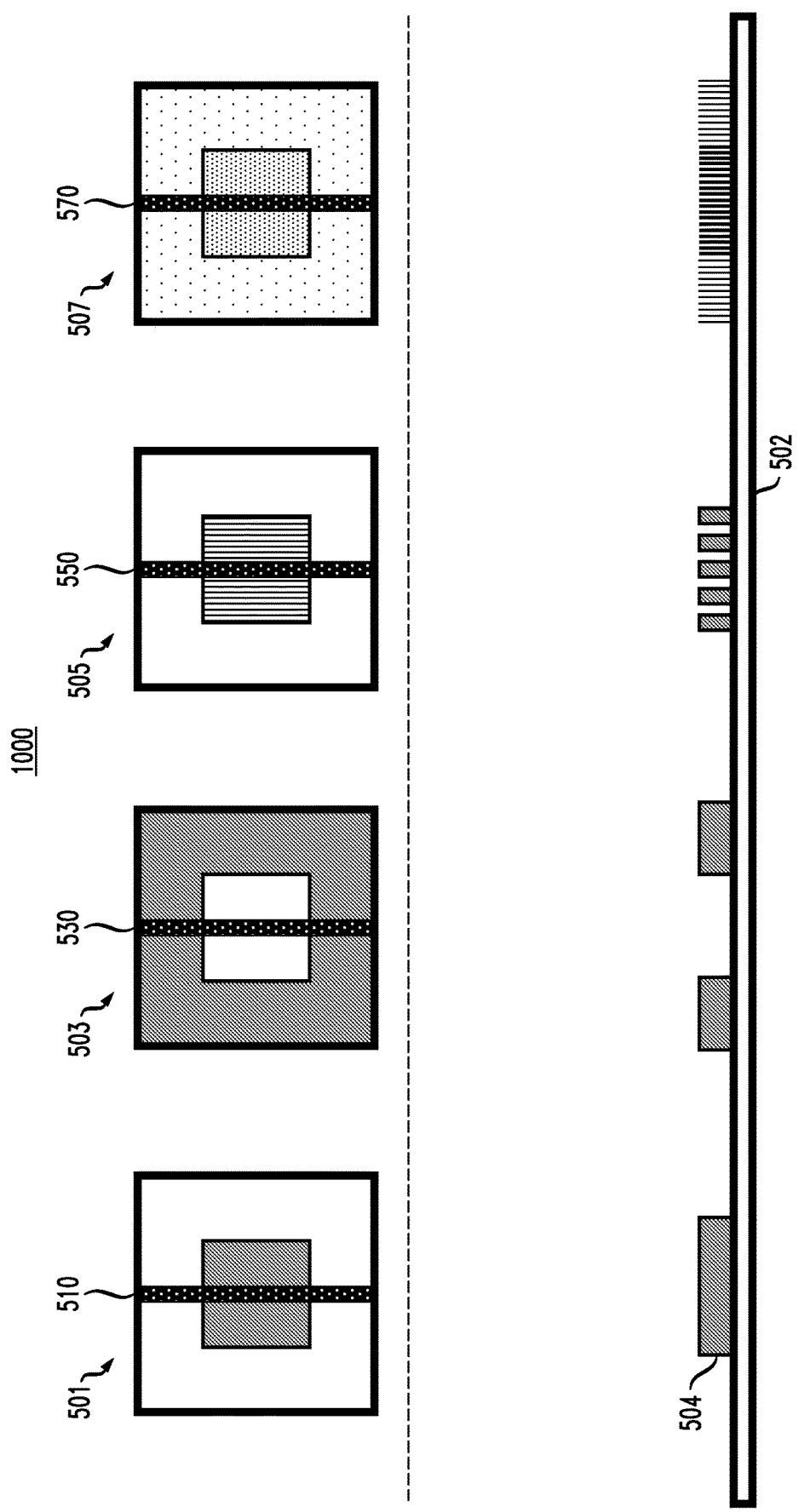
FIG. 10 depicts a cross-sectional view of the FIG. 9 structure following etching the material deposited over the substrate exposed by the resist material, according to an embodiment of the present invention.

FIG. 10 shows a cross-sectional view 1000 of the structure following etching portions of the blanket deposited material 504 that are exposed by the patterned resist material 506'. The patterned resist material 506' is then stripped or removed.

Figure 11:
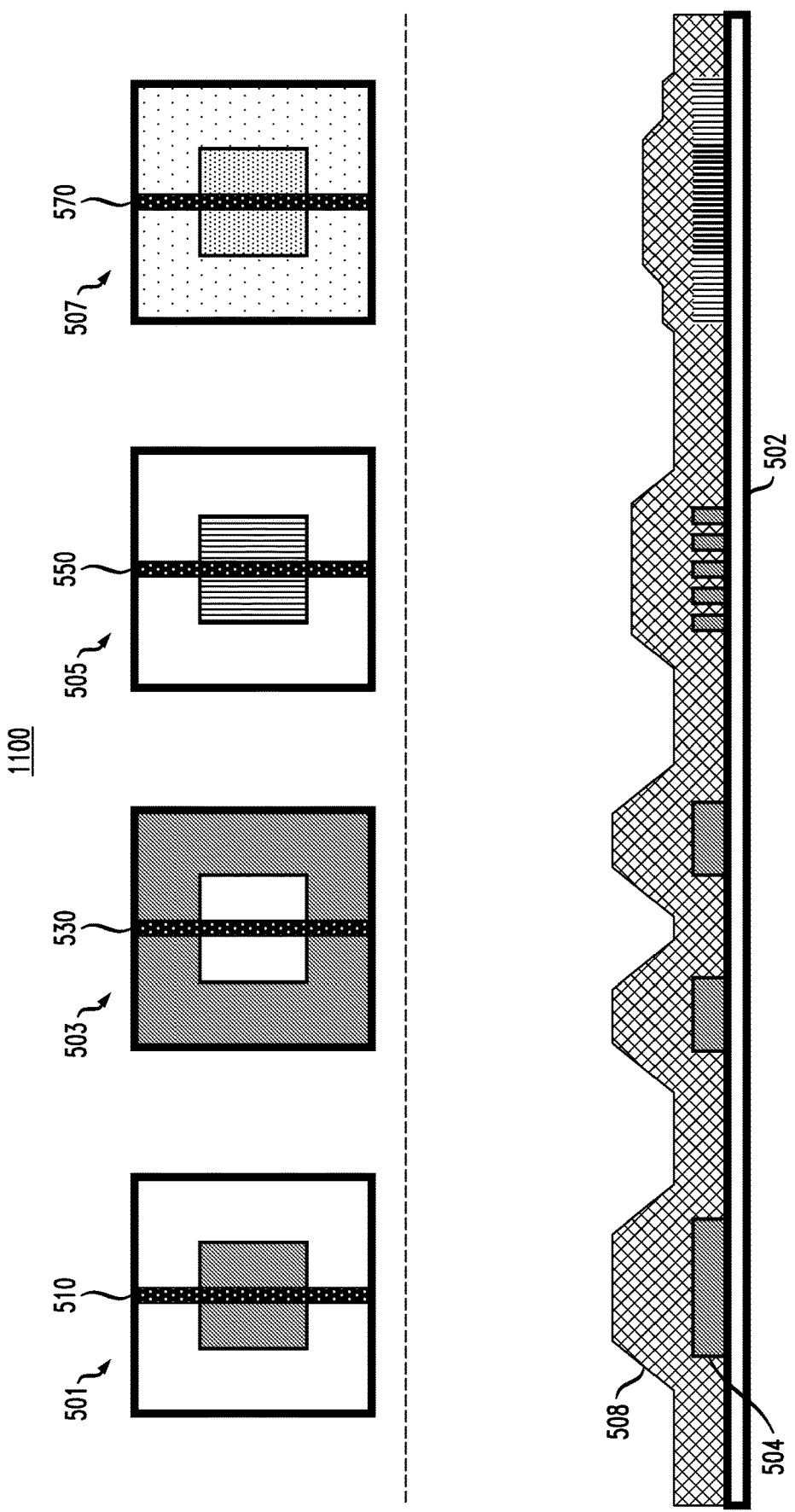
FIG. 11 depicts a cross-sectional view of the FIG. 10 structure following coating with a planarization material of interest, according to an embodiment of the present invention.

FIG. 11 shows a cross-sectional view 1100 of the structure following coating with a material of interest 508, such as an organic layer (e.g., spin-coated OPL, etc.).

Figure 12:
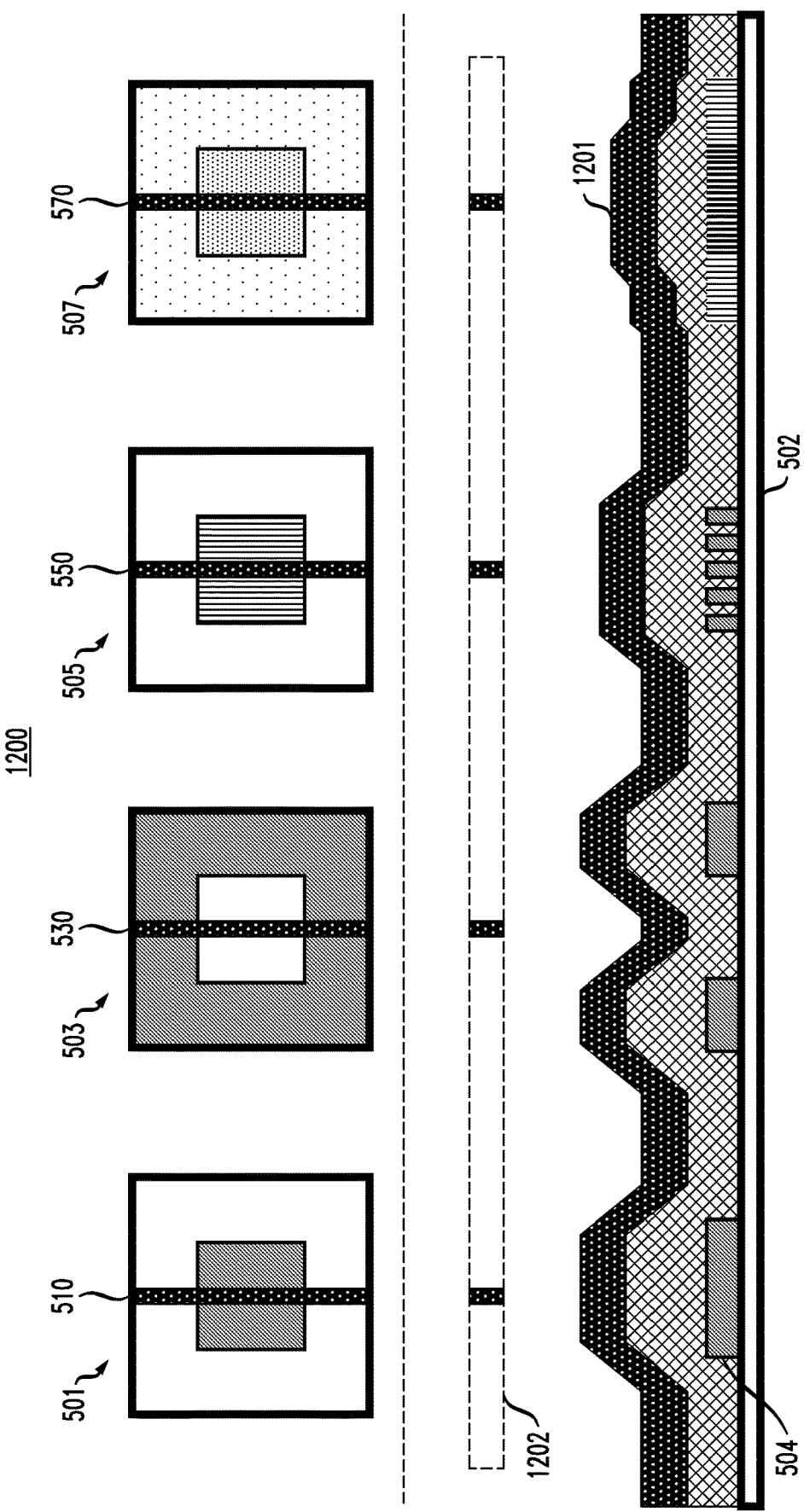
FIG. 12 depicts a cross-sectional view of the FIG. 11 structure following coating with a resist material, according to an embodiment of the present invention.
Figure 14A:
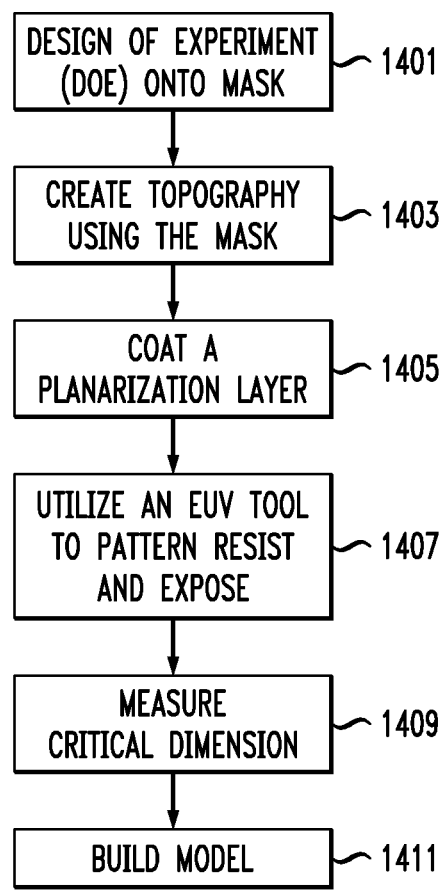
FIG. 14A depicts a processing flow for building a model of the planarization performance of a material, according to an embodiment of the present invention.

FIG. 12 shows a cross-sectional view 1200 of the structure following coating with a photo-sensitive resist material 1201. FIG. 12 also shows a second mask or reticle 1202, used for printing the metrology features 510, 530, 550, 570.

FIG. 13 shows a cross-sectional view 1300 of the structure following printing of the metrology features 510, 530, 550, 570 by exposing the photo-sensitive resist material 1201 using the second mask 1202. As shown in FIG. 13, the printed metrology features 510', 530', 550', 570' have different widths or critical dimension (CD), which are induced by the different focal planes shown in dashed lines 511, 531, 551, 571, respectively. The metrology features for the different design macros 501, 503, 505, 507 all have the same designed size or width. During exposure, if the metrology feature lands on a different focal plane (e.g., because of the un-even surface) it will affect the CD profile of the resist. Thus, the resulting printed metrology features 510', 530', 550', 570' have different widths or sizes. These differing widths behave according to the feature Bossung curve, as will be described in further detail below.

FIGS. 14A-14D depict a processing flow 1400 for building a model for how the CD behaves through different macro designs to give the planarization property of a given material of interest. The processing flow 1400 begins with step 1401, designing a design of experiment (DOE) onto one or more masks. In this embodiment, the DOE is represented by the combination of design macros shown in FIG. 4, where various features are varied including the inner density, outer density, inner CD, inner feature type (e.g., solid or empty, lines and spaces, pillars and holes, etc.) and outer feature type (e.g., solid or empty, lines and spaces, pillars and holes, etc.). It is to be appreciated, however, that a DOE is not limited solely to the FIG. 4 design macros. In other embodiments, the DOE may include more or fewer design macros created using the various degrees of freedom or parameters discussed above. The DOE illustratively includes many different design macros on the same mask.

In step 1403, each macro and its respective topography is created using a mask. In some embodiments, every design macro is assembled onto the mask (e.g., all the design macros to be used are patterned at the same time onto the mask). The mask represents the means by which photo-sensitive resist material is exposed. The first mask 801 shown in FIG. 8 is an example of the mask used in step 1403.

FIGS. 8-10, described above, illustrate an example of the processing in step 1403. FIG. 14B also shows an example of a structure having a topography created using the mask in step 1403. Although FIG. 14B shows an example where the inside and outside design features have different heights, it should be appreciated that this is not a requirement. In other embodiments, the patterned features of the inside and outside designs may have a same height. FIG. 14B shows a top-down view 1450 and a cross-sectional view 1475 taken along the line X-X of the top-down view 1450. For clarity of illustration, only a single design macro is shown in FIG. 14B (and subsequent FIGS. 14C and 14D). More particularly, FIG. 14B shows a topography 1404 (e.g., a lines and spaces outside design with a holes and pillars inside design) that is created on substrate 1402.

In step 1405, a planarization layer is coated over the structure on which topography was created in step 1403. FIG. 11, described above, illustrates an example of the processing in step 1405.

The processing flow 1400 continues with step 1407, where an EUV tool is used to perform necessary patterning to form an exposed feature on photo-sensitive resist (e.g., the "metrology feature" described above). FIGS. 12 and 13, described above, illustrate an example of the processing in step 1407. In step 1409, the CD is measured.

FIG. 14C shows a top-down view 1260 and a cross-sectional view 1285 of the FIG. 14B structure following the processing in steps 1405 through 1409. As shown, the CD of the metrology feature 1410 changes as it transitions (e.g., CD transition) between the outside (e.g., CD outer) and inside design (e.g., CD inner) of the design macro topography 1404 created on substrate 1402. The uneven surface of the planarizing material 1408 is the cause of the size differences in the CD between the inner and outer design. The difference in CD size relates to different focal planes. The metrology feature 1410 is printed on top of the planarizing material 1408, and the dimensions of the metrology feature 1410 vary due to the uneven positioning of the planarizing material 1408. The change in CD is harvested to build a model in step 1411. In some embodiments, the model is a series of Bossung curves which relate CD to focus. An example of processing for building the model in step 1411 will be described in further detail below with respect to FIGS. 15-21.

In FIG. 14C, the metrology feature 1410 is printed as a "line" over the planarizing material 1408. FIG. 14D shows an alternate embodiment, where metrology feature 1410' is printed as "holes" over the planarizing material 1408. This provides an alternate type of metrology feature for measuring CD (e.g., holes instead of a line). In some cases, the use of holes as the metrology feature illustrated in FIG. 14D provides a better understanding of the planarization throughout the design macro as a map. FIG. 14D shows a top-down view 1470 and a cross-sectional view 1495 of the FIG. 14B structure following formation of the metrology feature 1410' as described above. The cross-sectional view 1495 further shows where the CD inner, CD outer and CD transition are measured. Similar to the "line" metrology feature, the "holes" metrology feature has a same design size throughout. As planarization changes, however, the CD that is actually printed changes. The printed CD is affected by the design shape (e.g., of the metrology feature), the light dose, and focus. The design shape (e.g., a line, holes, etc.) and the light dose may be controlled. Focus can thus be determined by measuring the CD. The relationship between CD and focus may be plotted as a Bossung curve.

Figure 15:
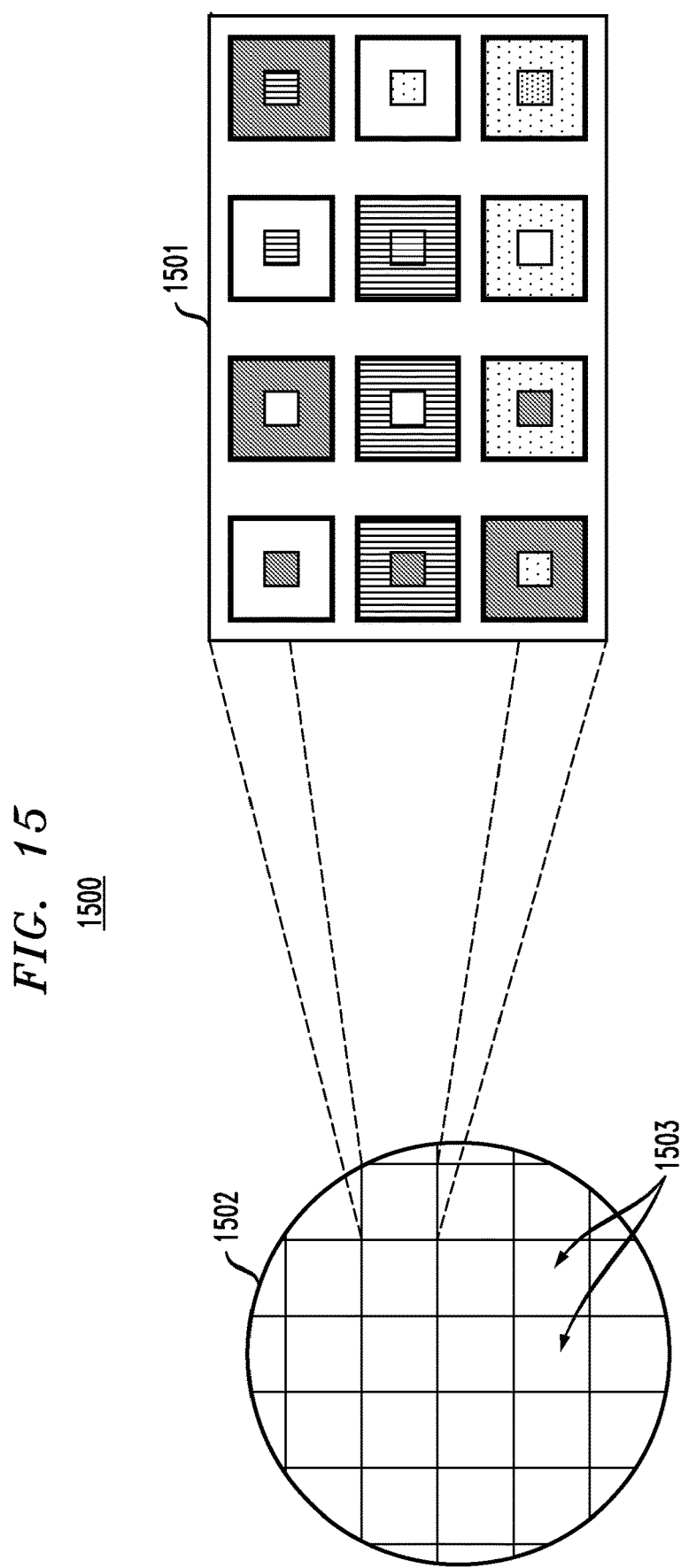
FIG. 15 depicts a top-down view of a wafer structure with multiple fields on which a design topography will be created, according to an embodiment of the present invention.

FIG. 15 shows a top-down view 1500 of a wafer 1502, on which a design 1501 is to be created. The design 1501 of FIG. 15 includes the design macros shown in FIG. 4, though it should be appreciated that other types of design macros may be used as desired. The wafer 1502 includes a number of fields 1503 (shown in a grid pattern, two of which are labeled in FIG. 15).

Figure 16:
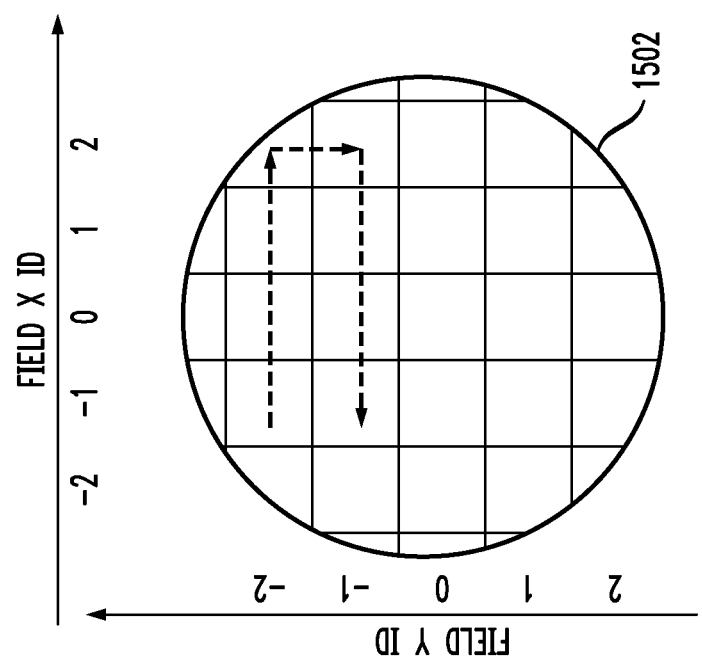
FIG. 16 depicts a top-down view of the FIG. 15 wafer with field labeling, according to an embodiment of the present invention.

FIG. 16 shows a top-down view 1600 of the wafer 1502, with the different fields 1503 labeled as shown. With the labeling shown in FIG. 16, each of the fields 1503 may be designated by a Field X identifier (ID) and a Field Y ID. Each field is exposed with a set of dose and focus as specified in the table 1601 shown in FIG. 16. In this example, the dose is kept the same for each field, with the tool (e.g., an EUV tool) having different focus settings as indicated. It is to be appreciated, however, that other processes may use different doses in addition to or in place of different focus settings.

Figure 17:
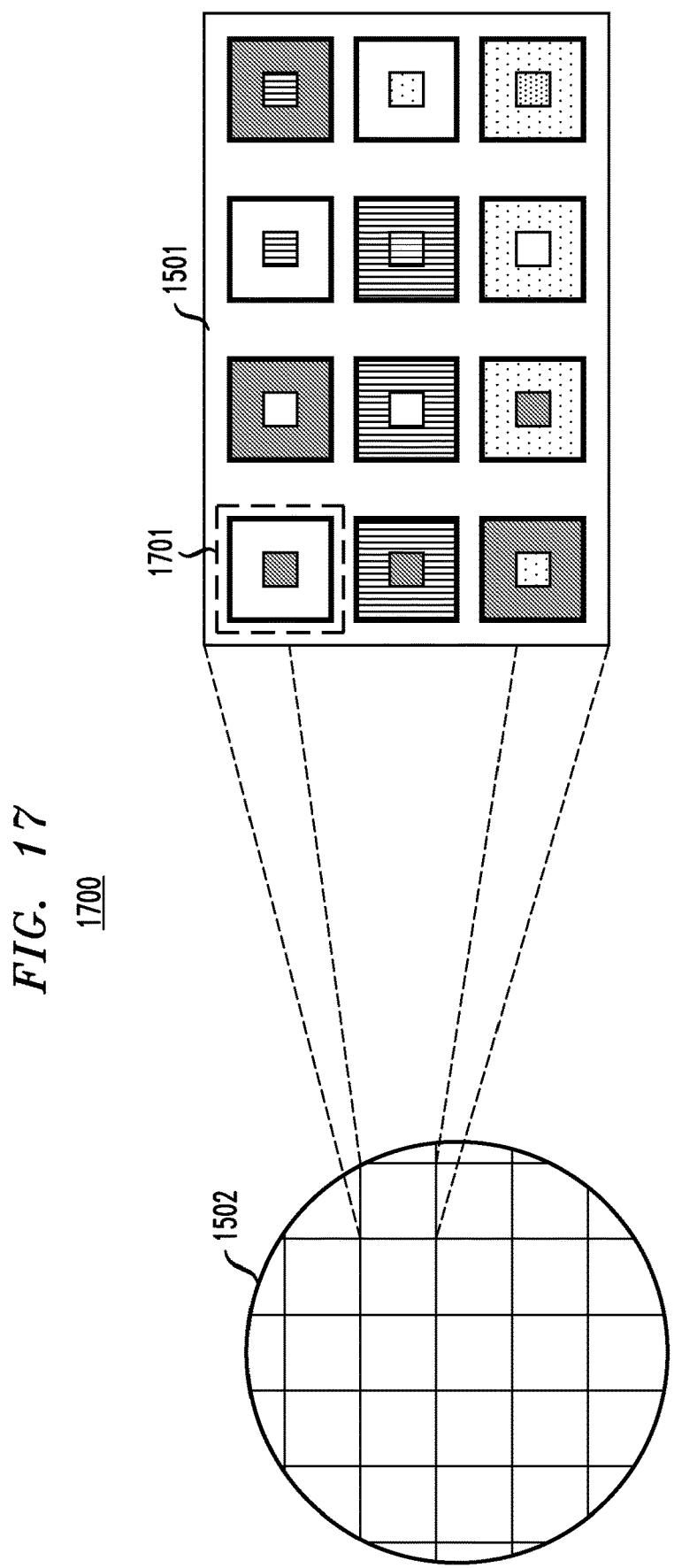
FIG. 17 depicts a top-down view of the FIG. 15 wafer showing a selected design macro to be printed on the fields of the wafer for defining an anchor Bossung curve, according to an embodiment of the present invention.

FIG. 17 shows a top-down view 1700 of the wafer 1502 along with design 1501 shown in FIG. 15. To define an "anchor" Bossung curve, one of the design macros of the design 1501 is selected. In the FIG. 17 example, the design macro 1701 is selected. It should be appreciated that the choice of design macro for use in defining the anchor Bossung curve is not limited—it may be any of the design macros of design 1501. In this example, the selected design macro 1701 is one of the simplest design macros (e.g., a blank or empty outside design with a solid inside design).

Figure 18:
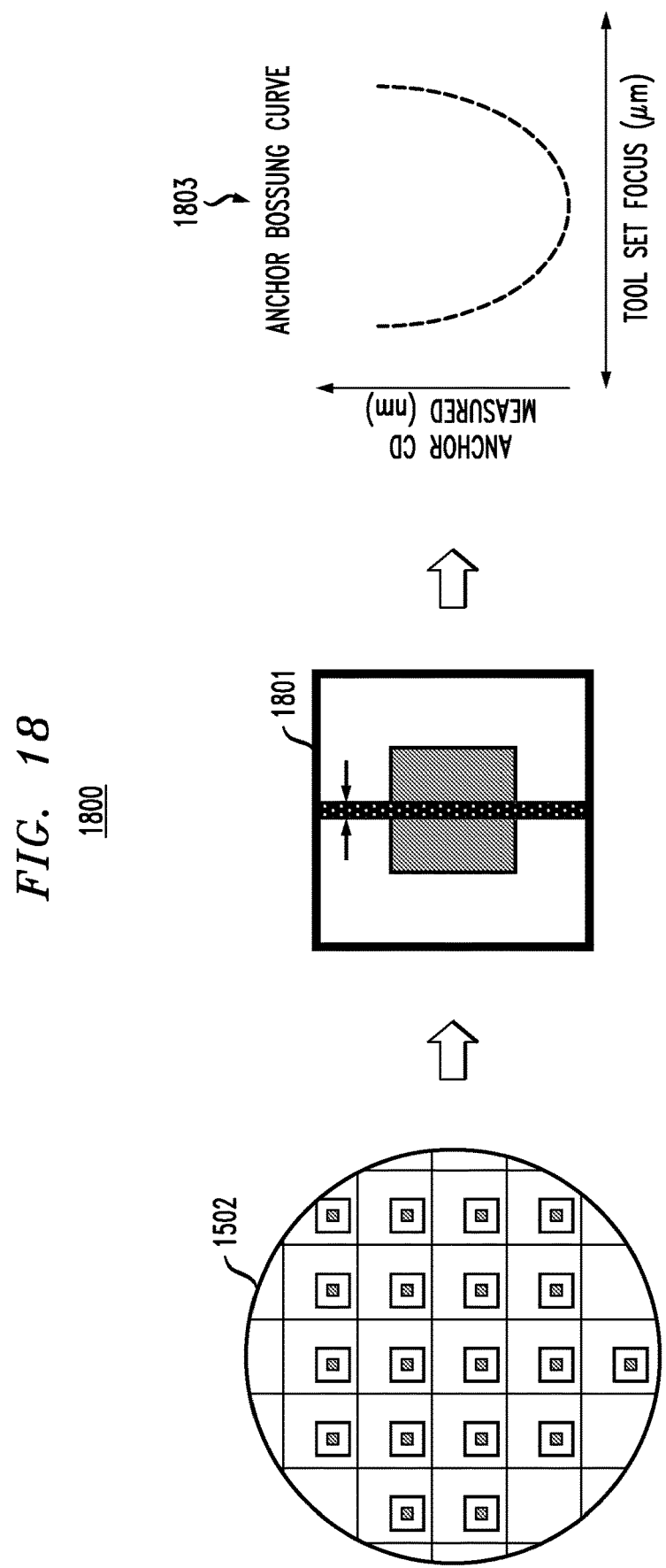
FIG. 18 depicts a top-down view of the FIG. 15 wafer having the selected design macro printed on the fields thereof for measurement of a metrology feature, according to an embodiment of the present invention.

FIG. 18 shows a top-down view 1800 of the wafer 1502 after the selected design macro 1701 is printed in each of the fields 1503. Once this is done, the metrology feature (e.g., 1801) is measured throughout the wafer 1502 (e.g., in each of the fields 1503 or in some designated number of the fields 1503 sufficient to obtain data for generating the anchor Bossung curve). Since the focus for each field is known (as it is a control parameter specified in the table 1601), the measured CD of the metrology feature 1801 across the fields 1503 of the wafer 1502 may be used to plot a reference or anchor Bossung curve 1803 through tool set focus.

Figure 19:
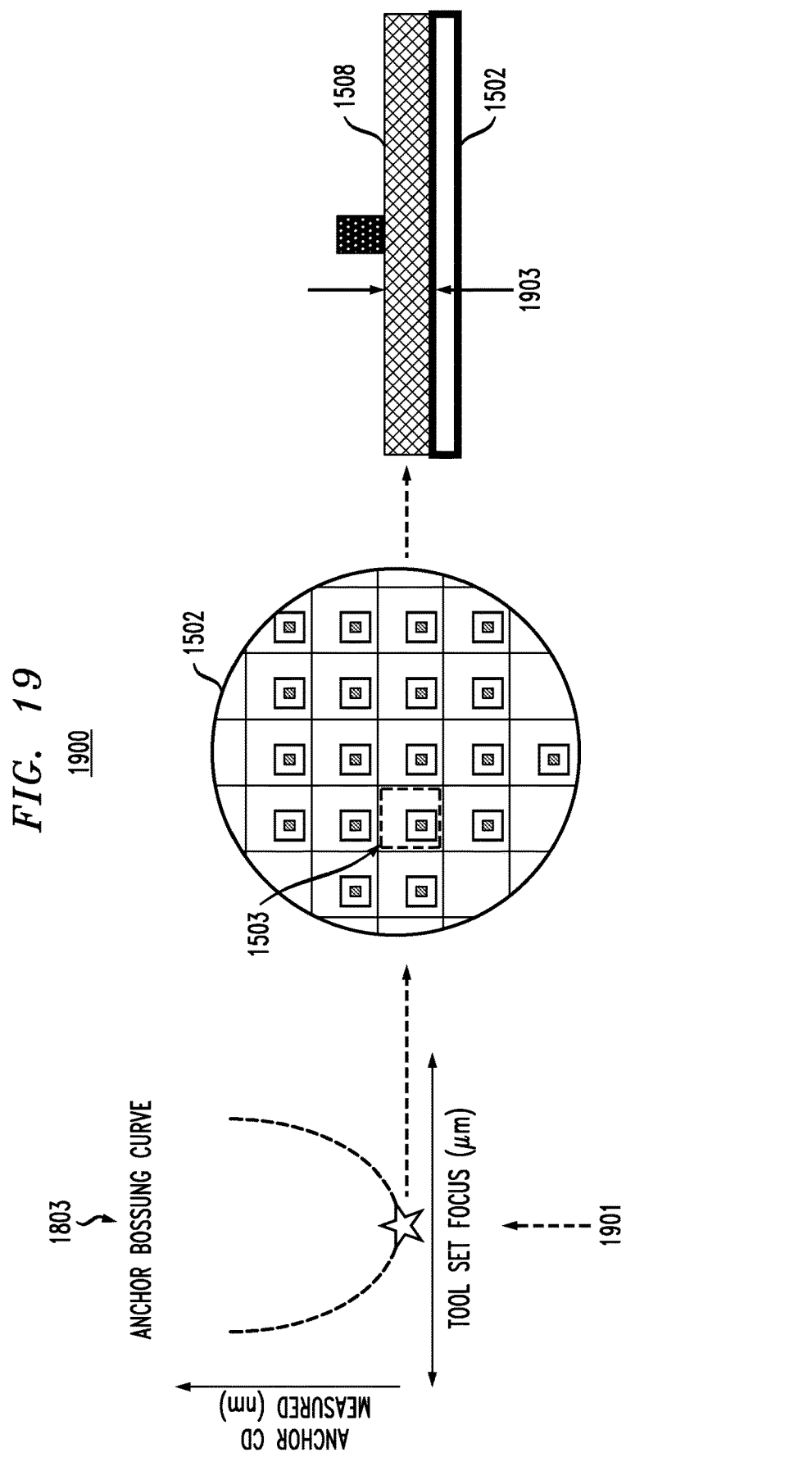
FIG. 19 depicts a top-down view of the FIG. 15 wafer having the selected design macro printed on the fields thereof along with an anchor Bossung curve, according to an embodiment of the present invention.

FIG. 19 shows a top-down view 1900 of the wafer 1502 having the selected design 1701 printed in each field 1503 thereof. FIG. 19 also shows the anchor Bossung curve 1803, with an optimal focus 1901 labeled with a star. The optimal focus 1901 corresponds to the absolute height 1903 of a planarizing material 1508 coated on the substrate 1502 on an area of the substrate 1502 on which no topography is created (e.g., a simplest feature being the absence of any created topography). To get the absolute model, a cross-section of the reference is obtained to get the absolute height 1903.

Figure 20:
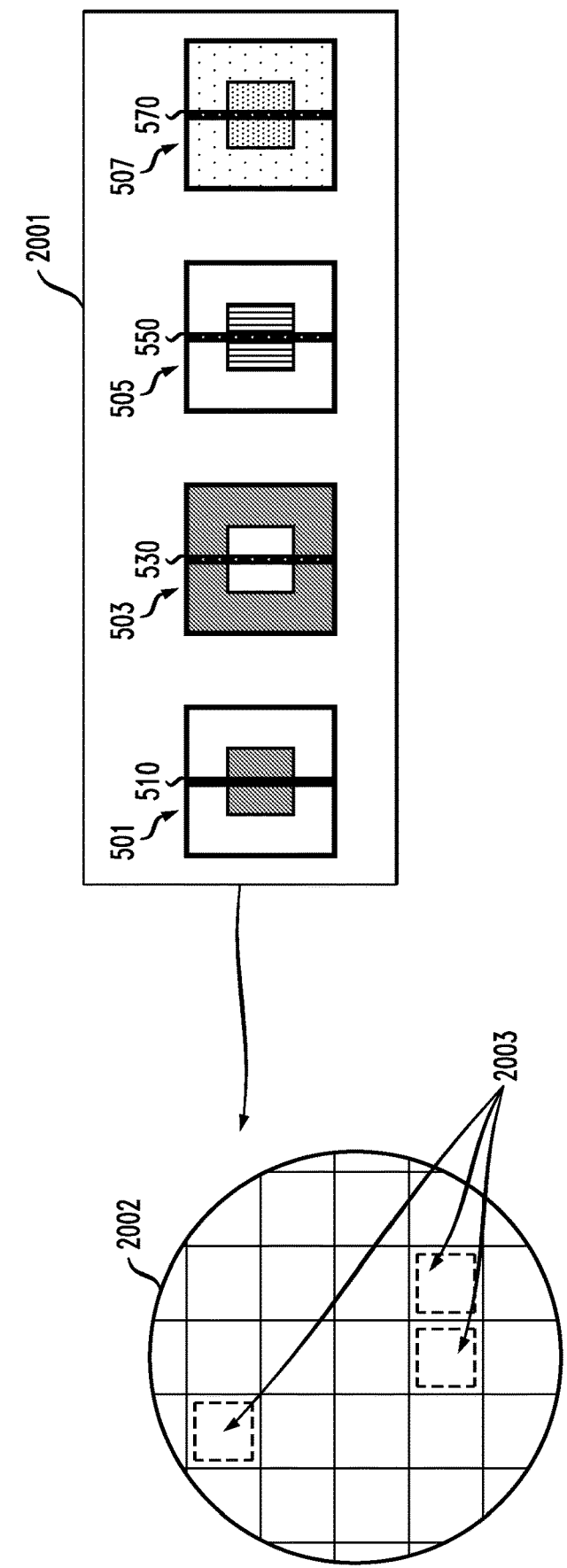
FIG. 20 depicts a top-down view of a wafer on which different design macros are to be printed for modeling planarization performance of a material, according to an embodiment of the present invention.

FIG. 20 shows a top-down view 2000 of wafer 2002. The wafer 2002 may be different than the wafer 1502, or may represent a different portion of the wafer 1502 on which design macros were not formed during the processing described above with respect to FIGS. 15-20. For the wafer 2002, a design 2001 including various design macros is printed in the various fields thereof and the metrology features of the different design macros are measured. In the FIG. 20 example, the design 2001 includes the design macros 501, 503, 505, 507 used in the processing of FIGS. 5-13, although this is not a requirement. Each of the design macros in design 2001 is formed on the substrate using the same dose and the optimal focus 1901 determined as described above. In some cases, a same one of the design macros (e.g., the design macro 501) in design 2001 is formed in multiple fields 2003 of the wafer 2002, with the CD measurements for such multiple fields 2003 being averaged to provide more accurate measurement.

Figure 21:
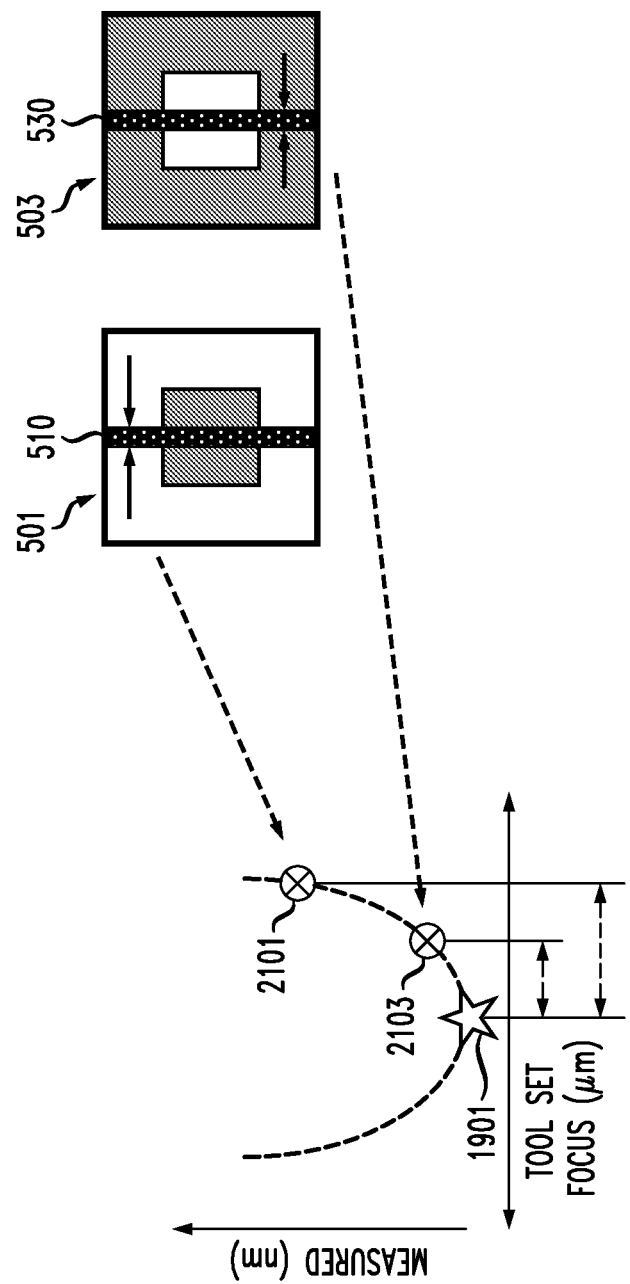
FIG. 21 depicts a plot illustrating offset in critical dimension for various design macros printed on the FIG. 20 wafer, according to an embodiment of the present invention.

FIG. 21 illustrates a plot 2100 showing offsets in CD for the various design macros in design 2001 printed on substrate 2002. As shown, design macro 501 of design 2001 has an offset in CD 2101 and the design macro 503 of design 2001 has an offset in CD 2103. Using the plot 2100, these offsets 2101 and 2103 may be related to offsets in focus or focal plane by relation to the absolute height 1903 of the optimal focus 1901. This information may be used to build a model characterizing planarization performance of a material, using the design data, measured CD and the anchor Bossung curve.

Figure 22:
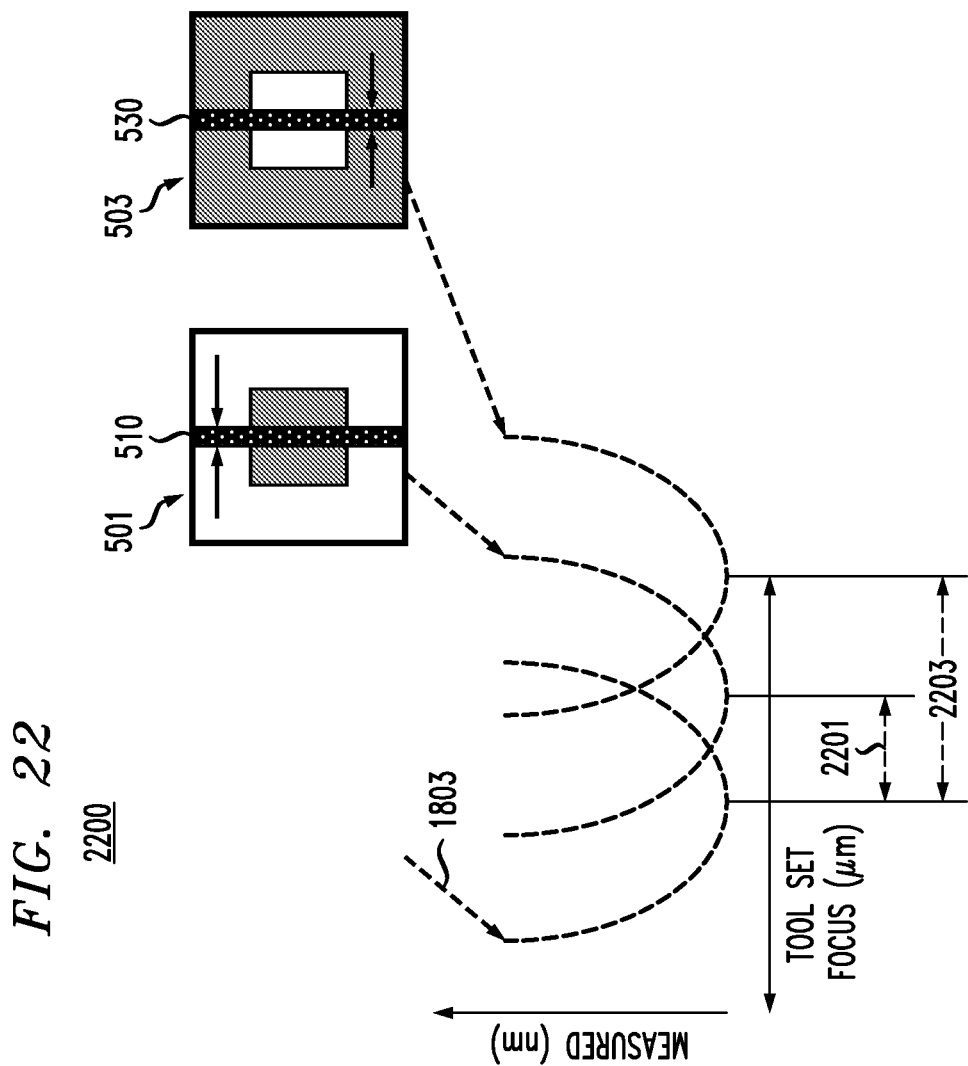
FIG. 22 depicts a plot illustrating offset in minima for various design macros printed on a wafer, according to an embodiment of the present invention.

While FIGS. 20 and 21 illustrate an example where a model is built by printing the various design macros of design 2001 on the wafer 2002 with a same dose and the optimal focus 1901, the model may also be based on or built by measuring the design macros of design 2001 through focus variation. FIG. 22 shows a plot 2200 illustrating such an arrangement, where different design macros (e.g., design macros 501 and 503) are measured through focus variation. By comparing measured minima of the different design macros and comparing to the minima (e.g., absolute height 1903 of the anchor curve 1803), the offset in minima for the different design macros can be related directly to an offset in focus. The design macro 501 topography may be related by offset 2201, and the design macro 503 topography may be related by offset 2203 as illustrated in the plot 2200.

In some embodiments, a method for modeling planarization performance of a given material comprises patterning, using a first mask, a first photoresist layer over a first material deposited over a top surface of a substrate, the first mask defining two or more different design macros to be patterned in two or more different regions of the first photoresist layer. The method also comprises etching portions of the first material exposed by the patterned first photoresist layer to create a patterned topography of the first material comprising the two or more different design macros in the two or more different regions, coating the given material over the patterned topography of the first material, and patterning, using a second mask, a second photoresist layer over the given material, the second mask defining a metrology feature for measuring a critical dimension in each of the two or more different regions. The method further comprises measuring the critical dimension of the metrology feature in each of the two or more different regions and utilizing the measured critical dimensions of the metrology feature in the two or more different regions to generate a model of the planarization performance of the given material by relating the measured critical dimensions to focal planes of the given material.

The substrate may comprise Si, the first material may comprise one of Si and SiO, and the given material may comprise a spin-coated organic layer.

Each of the two or more different design macros may comprise an inside design surrounded by an outside design. Each of the inside design and the outside design may comprise a pattern of one or more features, the one or more features comprising at least one of: a solid or blank design; a lines and spaces design; and a pillars and holes design. The two or more different design macros may have varying densities of the one or more features in the inside design and the outside design, varying sizes of the inside design and the outside design, varying heights of the one or more features in the inside design and outside design, etc.

Patterning the first and/or second photoresist layer may utilize an EUV patterning tool.

In some embodiments, a method for modeling planarization performance of a given material comprises patterning, using a first mask, a first photoresist layer over a first material deposited over a top surface of a substrate, the first mask defining a given design macro to be patterned in each of two or more different regions of the first photoresist layer. The method also comprises etching portions of the first material exposed by the patterned first photoresist layer to create a patterned topography of the first material comprising the given design macro in each of the two or more different regions, coating the given material over the patterned topography of the first material, and patterning, using a second mask, a second photoresist layer over the given material using different focus settings for a lithographic processing tool, the second mask defining a metrology feature for measuring a critical dimension of the given design macro in each of the two or more different regions. The method further comprises measuring the critical dimension of the metrology feature in each of the two or more different regions and generating an anchor curve relating the measured critical dimensions of the metrology feature with the different focus settings for the two or more different regions, wherein the anchor curve is used to model planarization performance of the given material.

The method may further comprise patterning, using a third mask, a third photoresist layer over the first material deposited over the top surface of an additional portion of the substrate, the third mask defining at least one additional design macro to be patterned in at least one additional region of the third photoresist layer using a focus setting corresponding to a minimal critical dimension of the anchor curve, etching portions of the first material exposed by the patterned third photoresist layer to create a patterned topography of the first material comprising the at least one additional design macro in the at least one additional region, coating the given material over the patterned topography of the first material in the at least one additional region, patterning a fourth photoresist layer, using the second mask, over the given material in the at least one additional region, and measuring a minimum of the critical dimension of the metrology feature formed over the additional design macro in the at least one additional region. The method may further comprise relating an offset in the minimum of the critical dimension of the metrology feature formed in at least one additional region to the minimal critical dimension of the anchor curve to build a model characterizing planarization performance of the given material. The additional region of the first material may be formed on a different substrate.

The method may further comprise patterning, using a third mask, a third photoresist layer over the first material deposited over the top surface of the substrate, the third mask defining at least one additional design macro to be patterned in at least one additional region of the third photoresist layer using the different focus settings for the lithographic processing tool, etching portions of the first material exposed by the patterned third photoresist layer to create a patterned topography of the first material comprising the at least one additional design macro in the at least one additional region, coating the given material over the patterned topography of the first material in the at least one additional region, patterning a fourth photoresist layer, using the second mask, over the given material in the at least one additional region, and measuring a minimum of the critical dimension of the metrology feature formed in the at least one additional region. The method may further comprise relating a focus setting of the lithographic processing tool for the minimum of the critical dimension of the metrology feature in the at least one additional region to the focus of the minimal critical dimension of the anchor curve to build a model characterizing planarization performance of the given material. The additional region of the first material may be formed on a different substrate.

In some embodiments, a method for modeling planarization performance of a given material comprises generating an anchor curve relating focus to critical dimension of a metrology feature formed over the given material in each of two or more different regions of a substrate, each of the two or more different regions of the substrate having a same design macro topography of a first material formed thereon. The method also comprises utilizing one or more additional design macros to pattern the first material on one or more additional regions of the substrate, the given material being coated over the one or more additional regions. The method further comprises measuring the critical dimension of the metrology feature formed over the given material in the one or more additional regions, and building a model of the planarization performance of the given material by relating measured critical dimension of the metrology feature in the one or more additional regions with the anchor curve.

The anchor curve may be generated by forming the same design macro topography with different focus settings for a lithographic processing tool in each of the two or more different regions. The lithographic processing tool may comprise an EUV lithographic processing tool.

Patterning the additional design macros in the topography of the first material in the one or more additional regions of the substrate may utilize a same focus setting for the lithographic processing tool, the same focus setting corresponding to a designated point of the anchor curve having a minimal critical dimension, wherein building the model comprises measuring an offset of a minimal critical dimension of the metrology feature in the at least one additional region to the designated point of the anchor curve.

Patterning the additional design macros in the topography of the first material in the one or more additional regions of the substrate may utilize the different focus settings for the lithographic processing tool, wherein building the model comprises measuring an offset of the minimal critical dimension of the metrology feature in the at least one additional region to a designated point of the anchor curve having a minimal critical dimension.

In the description above, various materials and dimensions for different elements are provided. Unless otherwise noted, such materials are given by way of example only and embodiments are not limited solely to the specific examples given. Similarly, unless otherwise noted, all dimensions are given by way of example and embodiments are not limited solely to the specific dimensions or ranges given.

Semiconductor devices and methods for forming same in accordance with the above-described techniques can be employed in various applications, hardware, and/or electronic systems. Suitable hardware and systems for implementing embodiments of the invention may include, but are not limited to, personal computers, communication networks, electronic commerce systems, portable communications devices (e.g., cell and smart phones), solid-state media storage devices, functional circuitry, etc. Systems and hardware incorporating the semiconductor devices are contemplated embodiments of the invention. Given the teachings provided herein, one of ordinary skill in the art will be able to contemplate other implementations and applications of embodiments of the invention.

In some embodiments, the above-described techniques are used in connection with semiconductor devices that may require or otherwise utilize, for example, complementary metal-oxide-semiconductors (CMOSs), metal-oxide-semiconductor field-effect transistors (MOSFETs), and/or fin field-effect transistors (FinFETs). By way of non-limiting example, the semiconductor devices can include, but are not limited to CMOS, MOSFET, and FinFET devices, and/or semiconductor devices that use CMOS, MOSFET, and/or FinFET technology.

Various structures described above may be implemented in integrated circuits. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for modeling planarization performance of a given material of a semiconductor structure comprising:
    patterning, using a first mask, a first photoresist layer over a first material deposited over a top surface of a substrate, the first mask defining two or more different design macros to be patterned in two or more different regions of the first photoresist layer;
    etching portions of the first material exposed by the patterned first photoresist layer to create a patterned topography of the first material comprising the two or more different design macros in the two or more different regions;
    coating the given material over the patterned topography of the first material;
    patterning, using a second mask, a second photoresist layer over the given material, the second mask defining a metrology feature for measuring a critical dimension in each of the two or more different regions;
    measuring the critical dimension of the metrology feature in each of the two or more different regions; and
    utilizing the measured critical dimensions of the metrology feature in the two or more different regions to generate a model of the planarization performance of the given material by relating the measured critical dimensions to focal planes of the given material;
    wherein the model of the planarization performance is utilizable for modeling formation of the semiconductor structure;
    wherein the model of the planarization performance of the given material is further generated based at least in part on an anchor curve that relates measured critical dimensions of metrology features for a same design topography formed with different focus settings of a lithographic patterning tool in multiple regions; and
    wherein patterning the first photoresist layer and the second photoresist layer utilizes a same focus setting for the lithographic processing tool, the same focus setting corresponding to a designated point of the anchor curve having a minimal critical dimension, and wherein building the model of the planarization performance comprises measuring an offset of a minimal critical dimension of the metrology feature in each of the two or more different regions to the designated point of the anchor curve.

2. The method of claim 1, wherein the substrate comprises silicon, the first material comprises at least one of silicon and silicon oxide, and the given material comprises a spin-coated organic layer.

3. The method of claim 1, wherein each of the two or more different design macros comprises an inside design surrounded by an outside design.

4. The method of claim 3, wherein each of the inside design and the outside design comprises a pattern of one or more features, the one or more features comprising at least one of: a solid or blank design; a lines and spaces design; and a pillars and holes design.

5. The method of claim 4, wherein the two or more different design macros have varying densities of the one or more features in the inside design and the outside design.

6. The method of claim 4, wherein the two or more different design macros have varying sizes of the inside design and the outside design.

7. The method of claim 4, wherein the two or more different design macros have varying heights of the one or more features in the inside design and outside design.

8. The method of claim 1, wherein at least one of patterning the first photoresist layer and patterning the second photoresist layer utilizes an extreme ultra violet patterning tool.

9. A method for modeling planarization performance of a given material of a semiconductor structure comprising:
    patterning, using a first mask, a first photoresist layer over a first material deposited over a top surface of a substrate, the first mask defining a given design macro to be patterned in each of two or more different regions of the first photoresist layer;
    etching portions of the first material exposed by the patterned first photoresist layer to create a patterned topography of the first material comprising the given design macro in each of the two or more different regions;
    coating the given material over the patterned topography of the first material;
    patterning, using a second mask, a second photoresist layer over the given material using different focus settings for a lithographic processing tool, the second mask defining a metrology feature for measuring a critical dimension of the given design macro in each of the two or more different regions;
    measuring the critical dimension of the metrology feature in each of the two or more different regions; and
    generating an anchor curve relating the measured critical dimensions of the metrology feature with the different focus settings for the two or more different regions;
    wherein the anchor curve is used to model planarization performance of the given material;
    wherein the model of the planarization performance is utilizable for modeling formation of the semiconductor structure;

wherein the anchor curve is generated by forming the given design macro topography with different focus settings for the lithographic processing tool in each of the two or more different regions; and building the model of the planarization performance comprises patterning additional design macros in the topography of the first material in one or more additional regions of the substrate utilizing a same focus setting for the lithographic processing tool, the same focus setting corresponding to a designated point of the anchor curve having a minimal critical dimension, and measuring an offset of a minimal critical dimension of the metrology feature in the at least one additional region to the designated point of the anchor curve.

10. The method of claim 9, wherein patterning the additional design macros comprises:

patterning, using a third mask, a third photoresist layer over the first material deposited over the top surface of an additional portion of the substrate, the third mask defining at least one of the additional design macros to be patterned in at least one of the one or more additional regions of the third photoresist layer using the same focus setting corresponding to the minimal critical dimension of the designated point of the anchor curve;

etching portions of the first material exposed by the patterned third photoresist layer to create a patterned topography of the first material comprising the at least one additional design macro in the at least one additional region;

coating the given material over the patterned topography of the first material in the at least one additional region;

patterning a fourth photoresist layer, using the second mask, over the given material in the at least one additional region; and measuring a minimum of the critical dimension of the metrology feature formed over the additional design macro in the at least one additional region.

11. The method of claim 10, further comprising relating an offset in the minimum of the critical dimension of the metrology feature formed in at least one additional region to the minimal critical dimension of the designated point of the anchor curve to build the model characterizing the planarization performance of the given material.

12. The method of claim 10, wherein the additional region of the first material is formed on a different substrate.

13. The method of claim 9, wherein patterning the additional design macros comprises:

patterning, using a third mask, a third photoresist layer over the first material deposited over the top surface of the substrate, the third mask defining at least one of the additional design macros to be patterned in at least one of the one or more additional regions of the third photoresist layer using the different focus settings for the lithographic processing tool;

etching portions of the first material exposed by the patterned third photoresist layer to create a patterned topography of the first material comprising the at least one additional design macro in the at least one additional region;

coating the given material over the patterned topography of the first material in the at least one additional region;

patterning a fourth photoresist layer, using the second mask, over the given material in the at least one additional region; and measuring a minimum of the critical dimension of the metrology feature formed in the at least one additional region.

14. The method of claim 13, further comprising relating a focus setting of the lithographic processing tool for the minimum of the critical dimension of the metrology feature in the at least one additional region to the focus setting of the minimal critical dimension of the designated point of the anchor curve to build the model characterizing the planarization performance of the given material.

15. The method of claim 13, wherein the additional region of the first material is formed on a different substrate.

16. A method for modeling planarization performance of a given material of a semiconductor structure comprising:

generating an anchor curve relating focus to critical dimension of a metrology feature formed over the given material in each of two or more different regions of a substrate, each of the two or more different regions of the substrate having a same design macro topography of a first material formed thereon;

utilizing one or more additional design macros to pattern the first material on one or more additional regions of the substrate, the given material being coated over the one or more additional regions;

measuring the critical dimension of the metrology feature formed over the given material in the one or more additional regions; and building a model of the planarization performance of the given material by relating measured critical dimension of the metrology feature in the one or more additional regions with the anchor curve;

wherein the model of the planarization performance is utilizable for modeling formation of the semiconductor structure;

wherein the anchor curve is generated by forming the same design macro topography with different focus settings for a lithographic processing tool in each of the two or more different regions; and wherein patterning the first material in the one or more additional regions of the substrate utilizes a same focus setting for the lithographic processing tool, the same focus setting corresponding to a designated point of the anchor curve having a minimal critical dimension, and wherein building the model comprises measuring an offset of a minimal critical dimension of the metrology feature in the at least one additional region to the designated point of the anchor curve.

17. The method of claim 16, wherein the lithographic processing tool comprises an extreme ultra violet lithographic processing tool.

18. The method of claim 16, wherein patterning first material in the one or more additional regions of the substrate further comprises utilizing the different focus settings for the lithographic processing tool, and wherein building the model comprises measuring an offset of the minimal critical dimension of the metrology feature in the at least one additional region to the designated point of the anchor curve having the minimal critical dimension.

* * * * *